(12) United States Patent
Solomon

(10) Patent No.: US 8,565,540 B2
(45) Date of Patent: Oct. 22, 2013

(54) DIGITAL IMAGE AND VIDEO COMPRESSION AND DECOMPRESSION METHODS

(76) Inventor: Neal Solomon, Oakland, CA (US)

(*) Notice: Subject to any disclaimer, the term of this patent is extended or adjusted under 35 U.S.C. 154(b) by 72 days.

(21) Appl. No.: 12/932,842

(22) Filed: Mar. 8, 2011

(65) Prior Publication Data

US 2012/0229664 A1  Sep. 13, 2012

(51) Int. Cl.
*G06K 9/46* (2006.01)
*G06K 9/36* (2006.01)
*H04N 5/228* (2006.01)

(52) U.S. Cl.
USPC .................. 382/232; 348/222.1; 382/166

(58) Field of Classification Search
USPC ............... 382/166, 232–253; 348/568, 14.13
See application file for complete search history.

(56) References Cited

U.S. PATENT DOCUMENTS

| 5,845,083 | A | * | 12/1998 | Hamadani et al. | 709/231 |
| 6,115,104 | A | * | 9/2000 | Nakatsuka | 355/40 |
| 7,715,642 | B1 | * | 5/2010 | Collins et al. | 382/242 |
| 2004/0201714 | A1 | * | 10/2004 | Chung | 348/220.1 |
| 2007/0273774 | A1 | * | 11/2007 | Holmes | 348/231.2 |

* cited by examiner

*Primary Examiner* — Roberto Velez
*Assistant Examiner* — Stephen Coleman

(57) ABSTRACT

A multi-functional digital imaging system is described that controls, manages and automates digital image compression and decompression methods. The digital image file is compressed and decompressed in a seven step modular user-adjustable lossless process.

13 Claims, 19 Drawing Sheets

| Layer # | Layer Name | Description of Method | |
|---|---|---|---|
| 1. | Pattern Analysis | Digital color image file analysis of computer elements | 20 |
| 2. | Black and White | Image file black and white elements are compressed | 30 |
| 3. | Extreme value elimination | R-G-B color elements of extreme value are eliminated and compressed | 40 |
| 4. | Numerical conversion | Image data file is numerically converted | 50 |
| 5. | Color space definition | Pixel blocks are organized and aliased to remove unnecessary pixels | 60 |
| 6. | Fuzzy Logic approximation | Fuzzy logic is applied to compress data set | 70 |
| 7. | Meta-data | File metadata is computed, including a key that tracks compression from original image | 80 |

1. Superfine grain - 4X4 block — 700

2. Fine grain - 8X8 block — 710

3. Medium grain - 16X16 block — 720

4. Course grain - 32X32 block — 730

5. Supercourse grain - 64X64 block — 740

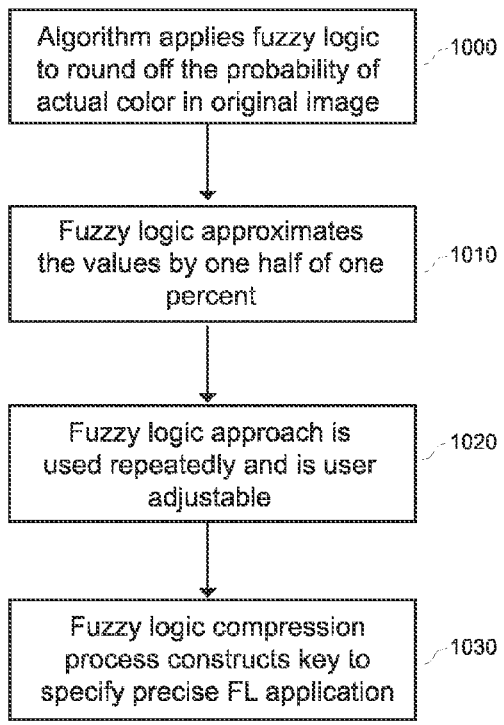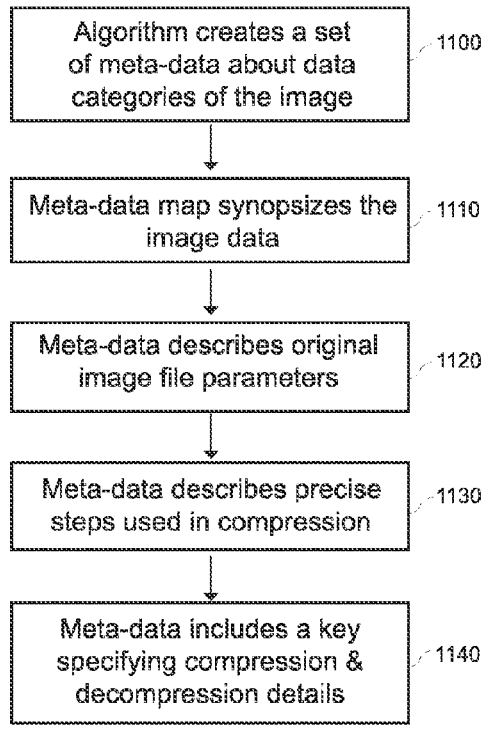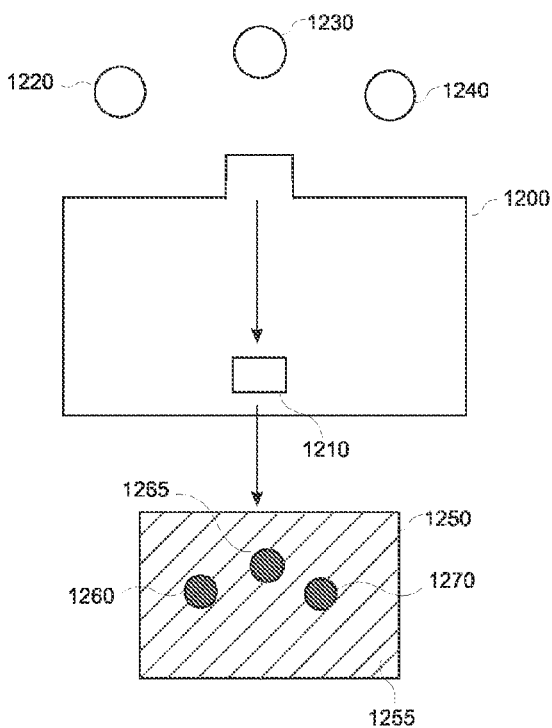

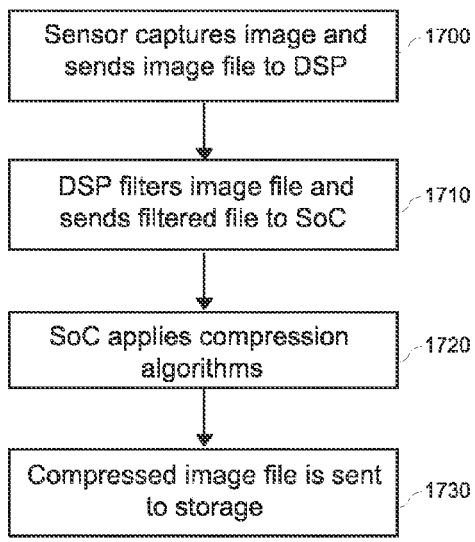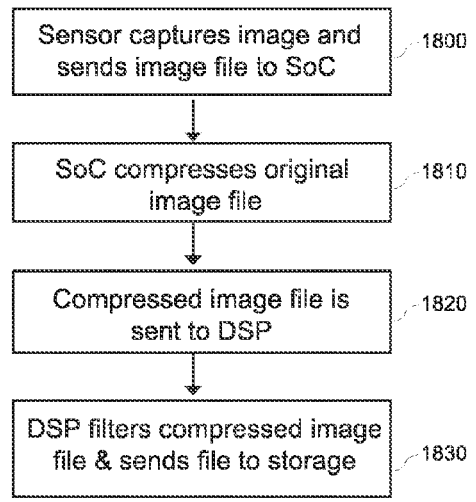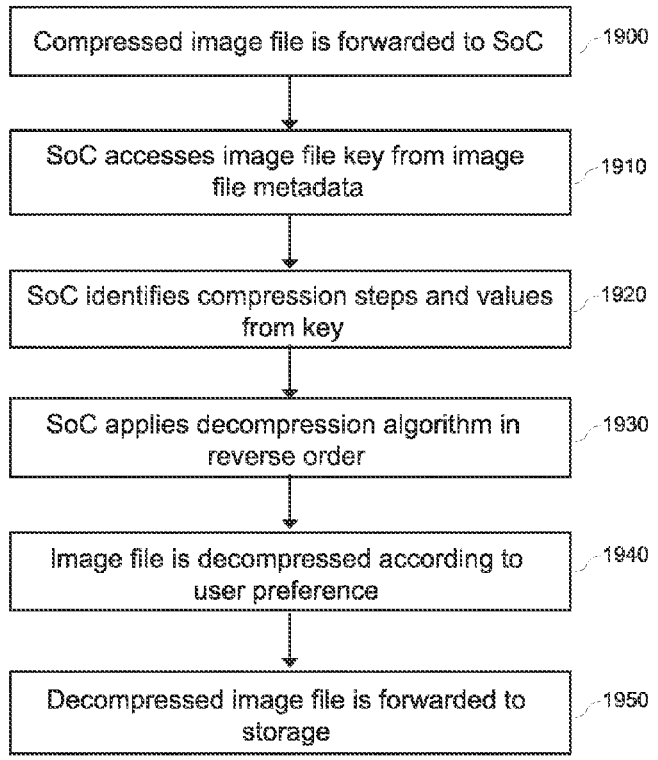

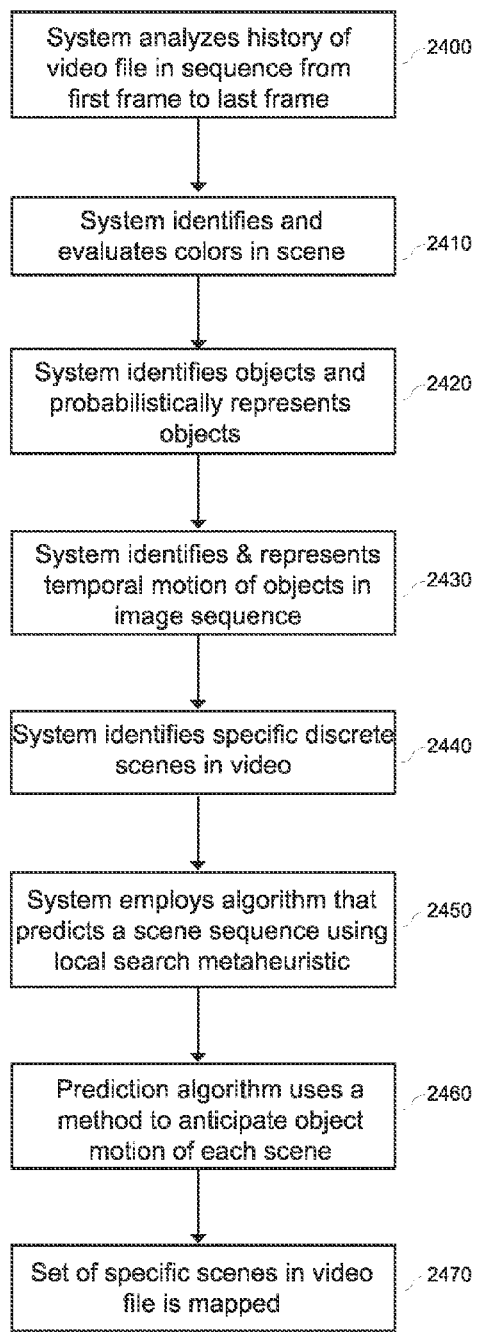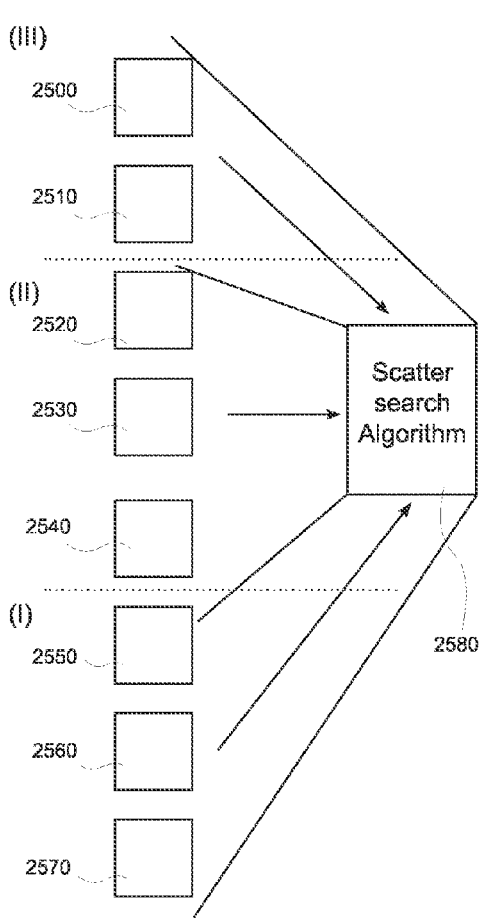

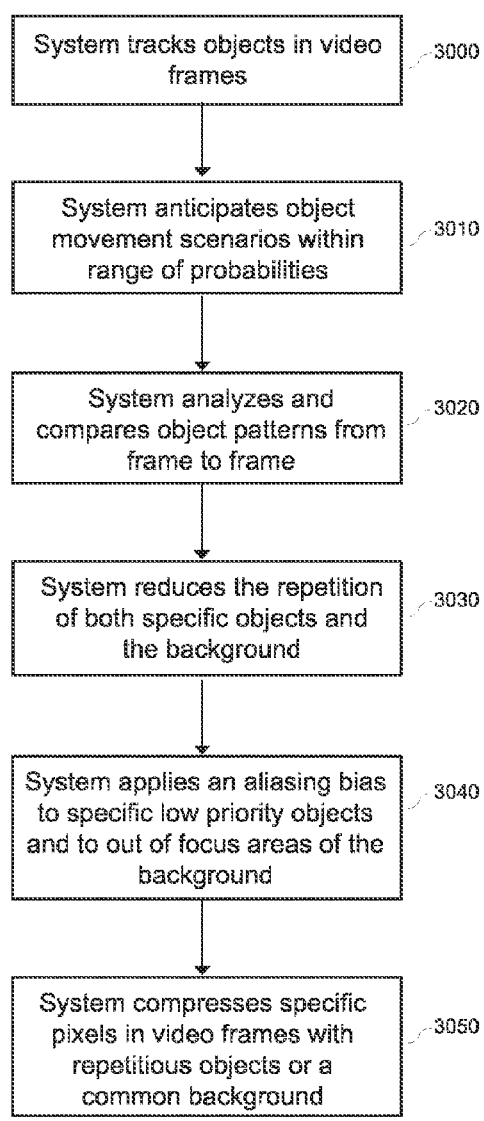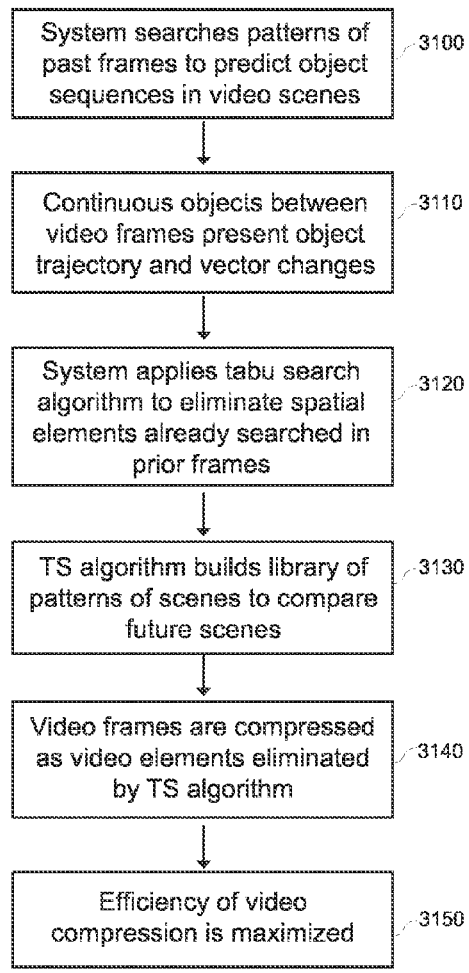

DIGITAL IMAGE AND VIDEO COMPRESSION AND DECOMPRESSION METHODS

CROSS-REFERENCES TO RELATED APPLICATIONS

The present application claims the benefit of priority under 35 U.S.C. §119 from U.S. Provisional Patent Application Ser. No. 61/338,771, filed Mar. 9, 2010, the disclosure of which is hereby incorporated by reference in their entirety for all purposes.

FIELD OF THE INVENTION

The invention pertains to the compression and decompression of digital and video images and image files.

BACKGROUND OF THE INVENTION

The dominant model for advanced digital photography is the digital single lens reflex (D-SLR) camera. In the main, most D-SLR cameras are organized to work within one paradigm. Film-based SLR cameras operate by using a lens apparatus connected to a camera body. When a shutter button is depressed, a microprocessor in the camera activates a shutter in the camera and an aperture in the lens to capture light onto a plane of film after a mirror flips up exposing the film. The silver-halide-based film is then chemically developed and images are preserved.

In a D-SLR, when the shutter button is depressed, a microprocessor (or SoC) in the camera activates a shutter in the camera and an aperture in the lens to capture light onto a digital sensor after a mirror flips up exposing the digital sensor. The sensor is typically either a charge coupled device (CCD) or a complementary metal-oxide semiconductor (CMOS) circuit that converts light to electrons. Once the sensor is exposed to light from the lens, camera circuitry moves the data from the sensor to a digital signal processor (DSP). The DSP performs a set of functions that filter the digital image file and transfers the converted data file to camera circuitry that stores and displays the corrected image file. A microprocessor (or SoC), which accesses a database in the camera, controls the image exposure settings, the internal camera circuitry and the mechanical operations of the shutter. In some cases, the camera microprocessor circuitry provides feedback to a microprocessor in the lens in order to measure and control the lens aperture and to synchronize exposure information between the lens aperture and the camera shutter. The user is able to manipulate the lens aperture, the camera shutter speed, the camera ISO speed, the data compression, and, in some cases, artificial light (such as a flash). The camera circuitry converts an analog image to digital format and converts the digital file to an analog image for presentation.

The field of image compression is divided into still and video.

Digital image and video compression algorithms solve complex optimization problems involving bandwidth and storage availability. As digital image and video files get larger, the problem of compression becomes more important.

Algorithms for compressing audio files use techniques for eliminating redundant or un-audible audio components. For instance, eliminating the very high and very low bandwidth audio signals allows the compression of a significant amount of total file size.

Digital image and video files, however, have complex specifications beyond only ocular perception limits. Compressing these file types requires implementation of a set of efficient algorithms. Restoration of compressed digital image and video files bit for bit involves lossless decompression and the exact compression of image and video information. Lossy compression, on the other hand, permanently eliminates a portion of the digital image or video file, which cannot be fully extracted upon decompression.

The two traditional models for compressing an image file involve (a) removing repetitive colors or (b) removing pixels. Removal of image details is typically performed on a set of pixels. A fast Fourier transform (FFT) is used to perform these operations. These techniques—embodied on JPEG standards—remove critical detail which is permanently lost. The effect of these traditional techniques is to compress images from twenty percent to ninety nine percent; these lossy approaches compromise image detail upon decompression. On the other hand, the Lempel-Ziv-Welch (LZW) algorithm is a lossless data compression technique applied to digital images.

As digital image and video file sizes increase relative to sensor size growth rates, it is important to develop a quality lossless compression-decompression (codec) algorithm.

The challenges presented include how to efficiently compress and decompress digital and video images in a lossless and scalable way and how to manage digital image storage and retrieval.

SUMMARY OF THE INVENTION

The still digital imaging (SDI) compression algorithm has seven steps. First, the digital color image file is analyzed for its component elements. Second, only the black and the white image elements in the image file are compressed. Third, only the R-G-B color layers in the image file are compressed. Because the human eye has a limited range of color perception, the algorithm limits its color image analysis to ocular constraints. Fourth, the image data file is numerically converted. Fifth, the pixel blocks are organized and aliased to remove unnecessary pixels. Sixth, fuzzy logic is applied to the image file to compress the data set. This step has a small amount of lossy, that is, unrecoverable, data. Seventh, the file metadata is computed, including a key that tracks the compression process from the original file.

Digital imaging has become ubiquitous in recent years. Consequently, the present invention applies to a range of imaging technologies. The imaging devices and systems to which the present invention applies include all digital cameras and digital video cameras. These camera devices include cell phones, PDAs, telephones, video camcorders, digital video cameras, digital SLRs, laptops, netbooks, tablet computers and video teleconferencing systems. The system also applies to medical diagnostics, sensor networks, satellite imaging systems, printers and copiers.

NOVELTIES OF THE INVENTION

Since the problem of larger, and escalating, image data files is becoming more prominent, the present system solves the problem of in-camera large file processing. This is performed, first, by employing a novel compression algorithm. Furthermore, using external computer network data storage dramatically transforms user work flow.

ADVANTAGES OF THE INVENTION

The present invention provides a set of advances to the field of digital imaging.

The present invention provides more efficient lossless compression and decompression of still and video images. The present compression algorithms allow digital memory space savings and bandwidth efficiency in image file storage and transmission.

LIST OF ABBREVIATIONS

ASIC, application specific integrated circuit
CCD, charge coupled device
CMOS, complementary metal oxide semiconductor
CRT, cathode ray tube
CPU, central processing unit
DCT, discrete cosign transform
DOF, depth of field
D-SLR, digital single lens reflex (camera)
DSP, digital signal processor
DVI, digital video imaging
EPCA, exposure priority camera activation
FPGA, field programmable gate array
FFT, fast Fourier transform
LCD, liquid crystal display
LED, light emitting diode
MOOP, multi-objective optimization problem
MP, microprocessor
OLED, organic light emitting diode
OPCA, object priority camera activation
PDA, personal digital assistant
RGB, red green blue
SDI, still digital image
SoC, system on chip

DESCRIPTION OF THE MAIN EMBODIMENTS OF THE INVENTION

The present invention describes a set of algorithms for compression and decompression of digital image and video files.

(1) Methods for Digital Color Image File Compression

The still digital imaging (SDI) compression algorithm has seven steps. First, the digital color image file is analyzed for its component elements. Second, only the black and the white image elements in the image file are compressed. Third, only the R-G-B color layers in the image file are compressed. Because the human eye has a limited range of color perception, the algorithm limits its color image analysis to ocular constraints. Fourth, the image data file is numerically converted. Fifth, the pixel blocks are organized and aliased to remove unnecessary pixels. Sixth, fuzzy logic is applied to the image file to compress the data set. This step has a small amount of lossy, that is, unrecoverable, data. Seventh, the file metadata is computed, including a key that tracks the compression process from the original file.

Since different algorithms are used for each stage, the combination of the steps refers to a hybrid combination algorithm for digital image compression. The combination of steps is progressive, so that more compression is provided with each successive step; when less compression is needed, the final step(s) are abbreviated or eliminated. In this way, the compression algorithm scales to the requirements of the user as bandwidth and storage is constrained.

(A) Pattern Analysis Layer. In the initial phase, the algorithm analyzes the image component elements. Pattern analysis is used to evaluate the original uncompressed digital image. Pattern recognition algorithms are used to identify the relationships of, and differentiation between, pixel values.

In this initial phase, the algorithm maps a one-for-one bit map of the image file. Each pixel is registered for specific color values. The initial pixel mapping is critical to evaluate the overall configuration of black, white, red, green and blue values of each pixel.

(B) Black-and-White Layer. A high proportion of digital images are simply black space or white (empty) space. In pigment analysis, white is the value of no color and black is the value of all colors, while in transparency, light is the combination of all colors and black is no color. These extreme dark and extreme light colors are mapped. The extreme black colors are compressed to be relatively less black. On the other side of the spectrum, the extreme white colors are compressed to be relatively less white.

By reducing the redundancy of these extreme polar color components of the image spectrum, a significant compression is made. If a typical digital image is comprised of a total combination of black and white elements that are half of the image, then this initial compression step alone is significant. Empty space is the simplest image component to reduce, which is performed by this step in the hybrid compression algorithm.

(C) Extreme-Value Elimination Layer. A charge coupled device (CCD) or CMOS sensor is used to convert optical data into electronic data. The CCD transforms optical data into pixels. However, in general, the CCD conversion process is not performed in color. A Bayer filter is used to convert the grey-scale data to color data. Because the human eye perceives green more than red or blue, the filtration step typically biases to 50% green and 25% each for red and blue.

First, since the initial sensor filtration bias is on green, the present system reduces the green bias in order to eliminate data file space and compress the image file.

Second, the image contrast and brightness is analyzed. The image brightness and contrast is correlated to color. For example, the dimmer the image, the less color detail is shown in the image and vice versa. This brightness and contrast information is integrated into the color analysis.

In an embodiment of the extreme-value elimination layer, the algorithm simulates the disabling of the Bayer filter on the image sensor so as to yield only a gray scale image file. By removing color to the original pre-Bayer filter phase, image file details are substantially reduced. Consequently, the file size is reduced. Upon file reconstruction, the Bayer filter "colorizes" the decompressed image file.

Third, the present invention creates a set of three layers, one for each color, and analyzes the most essential color use by eliminating the extreme high and low levels of each color. The degree of compression is user selected and corresponds to the degree of selection of the high and low levels of each color. This phase of the compression process is intended to eliminate extremes in color variation that is imperceptible to human vision.

The R-G-B colors are then mapped onto each pixel with a modified value set after the compression level is selected. This is a rough color compression phase.

(D) Numerical R-G-B Conversion Layer. The image file is then converted to numbers representing each pixel. The numeric transformation occurs in 36-bit RGB color space. Each color (red, green and blue) is converted to a 12-bit color scale. Each pixel has an intensity level from 1 to 4096 in whole integers, with a total color palate of millions colors.

In an embodiment of this process, the system uses a 48-bit RGB color space, with a 16-bit color scale (65,536 color intensity level).

(E) Color Space Definition Layer. Once the color space is defined, the pixels in the image are processed as blocks. The compression process allows the user to select one of five main block structures for fine or course grained image processing. The modes include super-fine grain mode (4×4 block), fine grain mode (8×8 block), medium grain mode (16×16 block), course grain mode (32×32 block) and very course mode (64×64 block). After the tile configurations of blocks are selected, the algorithm converts the numeric values in each block, and aggregates the blocks in the image. By reducing the pixel components of each block, the algorithm effectively aliases each block to reduce the composition of the pixels.

The system uses local search algorithms (including scatter search algorithms) to analyze and perform the aliasing function.

(F) Fuzzy Logic Approximation Layer. The present system uses fuzzy logic to "round" up or down the probability of the actual color in the original image. The fuzzy logic algorithm is adjustable so as to scale the final compression output.

Fuzzy logic is used to approximate values of digital signals. By approximating the values by less than one half of one percent, the resulting values are imperceptibly changed, but the ultimate effect is to eliminate waste and preserve file size. Fuzzy logic processes, however, can be used repeatedly so as to continually reduce a digital image file size. The use of multiple fuzzy logic steps is user adjustable.

The main constraint for use of fuzzy logic in digital compression is that it is lossy. Once fuzzified, there is generally no recovery of lost data details. After the approximation algorithm is applied, it is often not possible to fully reconstitute the image to the exact original file. The more number of steps that are used by the fuzzy logic algorithm, the more the data is typically lost.

However, in order to decompress the fuzzified image file, the decompression algorithm contains a key of the fuzzy logic process and the number of steps applied to the digital image file. Use of this key allows the algorithm to minimize lossy image elements.

(G) Meta-data Layer. While each digital image is analyzed at the pixel level, after the several steps of the hybrid compression algorithm are applied to the digital color image file, the algorithm creates a set of meta-data about data categories of the image. In effect, the algorithm creates a meta-data map that synopsizes the image data. What data are left after the image compression process represent (a) a resulting compressed image data file, (b) a meta-data file and key of the compression process, step by step, and (c) the image data used to describe the frame of the original image.

The image meta-data key describes the sequence and details of the digital compression process. The key is used to reverse, or decompress, the process. The compressed file is converted to a set of values for each pixel that markedly increases the efficiency of the image file structure while also seeking to provide a lossless data file within the constraints of human perception.

The digital image compression algorithm is implemented in a compression-focused special purpose ASIC, SoC or in a DSP. The ASIC, SoC or DSP may implement the specific algorithms for color image compression using a FFT.

(2) Methods for Analysis of Objects and Image Background for Digital Color Image File Compression In the present invention, the image is analyzed for specific objects. When an object or contiguous image element is identified, the algorithm preserves pixel integrity. On the other hand, in image elements such as the image background or blurry components resulting from limited depth of field, the algorithm aliases the pixels to remove detail. This object-based compression process is useful.

The process begins by identifying the object categories in the image, by selecting the main object, and by identifying the DOF in the image. The main object is analyzed in concentric circles around the main object to compare adjacent image elements.

First, objects are differentiated between major objects and inferior objects. This is performed by applying local search algorithms. Inferior objects receive increased aliasing. While the main object(s) borders are clearly delineated, including highlight and shadow detail on the object(s) periphery, the space within the main object(s) receive minimal pixel reduction.

Second, the object compression process aliases objects outside the area representing the primary range of DOF around main objects. The out of focus areas, including background and foreground, receive increased pixel reduction relative to the in-focus objects.

Image blocks are analyzed to differentiate objects and out-of-focus regions. Specific sections of pixel blocks are aliased while other sections are left intact.

The object-sensitive component of the compression process supplements the main image compression approach.

The object-sensitive aspect of compression is also useful in video compression algorithm applications.

(3) Methods for Acceleration of Digital Color Image File Compression Process

It is possible to accelerate the image compression process described herein. First, each quadrant of the image is demarcated and the compression process is performed simultaneously on each quadrant.

Second, the present system sorts each image type into similar categories and batch processes the similar images. For example, when a set of images of the same scene is taken consecutively, such as a single object, the batch processing method uses an initial analysis of the first image and similar algorithm applications for each subsequent image in the batch of similar images.

The use of the main algorithms to compress a digital image file described herein is also performed in different order. This reduction of steps accelerates the compression process.

Moreover, after an initial run through the main steps, another pass of increased compression continues to compress each element until the preferred compression values are achieved. The user may set the compression goal and the algorithm sequence repeats specific steps to achieve the goal.

The use of acceleration techniques limits the time to efficiently process compression on digital image files. The intensification process further increases the extent and degree of compression.

Because the digital image hybrid compression algorithm is progressive and scalable, it is possible to variably adjust each component in the process to correspond to specific constraints of time, storage and bandwidth. An algorithm analyzes these constraints and constructs a set of preferences for the settings of each of the major steps of the hybrid algorithm to optimize overall system performance within the constraints. For example, when there is limited storage, but sufficient bandwidth and unlimited time, the hybrid compression algorithm is adjusted to perform its functions normally. However, when there is limited storage capacity and limited time, the efficiency of the hybrid compression algorithm is enhanced and the acceleration techniques are applied.

In an embodiment of the present invention, the image file is filtered concurrently with the compression of the file. The sequence of filtration is performed before each step of the compression sequence. In this way, the image file is both filtered and compressed. In the camera, this is performed by using an ASIC, DSP or SoC for filtration that precedes the sequence of processing for the compression.

In another embodiment, the image is filtered after the compression process. This approach saves space but limits the file data available for filtration. This approach, however, allows the subsequent filtration techniques to correct for the lost attributes of the compression algorithms, which provide an improvement on a compressed file. Once compressed and filtered, the image data file is either stored in camera or transmitted by broadband to storage in a remote computer.

(4) Method for Digital Color Image File Decompression

Once a file is compressed, it is decompressed in order to preserve the original bit values. When a digital color image file is compressed using lossless techniques, the reversal of the techniques will retrieve an original image file. In order to achieve this result with a lossless hybrid compression algorithm, the ASIC, SoC or DSP uses a key, comprised of the specific compression layer steps used to compress the image, so as to reconstruct the image file to its original state. The decompression algorithm may apply the steps in reverse order or in forward order in order to extract the original data set.

Because the present invention has a fuzzy logic step in the hybrid compression algorithm, however, there is a lossy component to the algorithm. In other words, there is generally no way, once the fuzzy logic component is implemented, to return the image to the original state because some of the data was permanently lost. While the first steps will retrieve original data from the lossless compression approach, the lossy data component constrains total reconstitution of the original image.

In order to retrieve much of the lossless components of the compression data, the present system applies the key used in the original hybrid compression algorithm. The key specifies the precise selections of each image compression layer and stores this in the image meta-data. Use of the key provides the exact code for the decompression algorithm.

In order to retrieve some of the lossy data from the fuzzy logic step, the decompression algorithm uses a key from the fuzzy logic compression algorithm. By assessing the exact probabilities used in the sequence of steps of the fuzzy logic step of the original compression algorithm, it is possible to reasonably reconstruct the original image data file. While using this method will not result in total bit-for-bit lossless reconstruction, it will improve on the lossy step considerably.

Since the hybrid compression algorithm progresses in a series of steps in order to obtain a progressively compressed image file, the decompression algorithm uses layers to decompress only part of the file necessary to complete a specific procedure. This approach to decompression provides flexibility to keep the file compressed to preserve efficiency and to allow limited decompression on demand.

A compressed image may be transmitted to a remote computer in a computer network and then decompressed for analysis and filtration of the original image; the compression is useful in order to increase transmission efficiency. Similarly, in order to maximize space constraints, images may be selectively compressed.

In one embodiment of the invention, once the image has been transmitted, it is sent through an ASIC, SoC or DSP that decompresses and then filters the image file in order to improve on the original image. In this approach, the image is not filtered in camera, but rather filtered by more substantial DSP processes in a remote computer.

(5) Method for Digital Video File Compression

Compression of digital video files involves analysis of two dimensional spatial geometry of each video frame and one temporal dimension. While video compression algorithms involve digital image analysis, they transcend spatial geometrical analyses alone. Most traditional video compression algorithms involve inter-frame compression that analyzes data from frames before and after a given video frame. The goal of traditional video compression algorithms, particularly in lossless compression schemes, is elimination of redundancy. In order to achieve redundancy reduction, most video compression algorithms discard some repetitious frames. Repetitious frames are analyzed by comparing object movement in image frames before and after each image sequence. Generally, this process involves evaluation of still objects that flows continuously between frames; evaluating a moving object between frames requires increased computational resources.

The discrete cosine transform (DCT) is commonly used to perform spatial redundancy reduction between frames. The method uses spatial compression of common elements between frames.

The present invention uses a hybrid algorithm to analyze and compress digital video files. The present system is a digital video imaging (DVI) compression algorithm. Note that the DVI compression algorithm uses elements from the SDI compression algorithm, including a pattern analysis layer, a B&W layer, an extreme value elimination layer, an RGB layer, a color space definition layer, a numeric conversion layer, a fuzzy logic approximation layer and a meta-data layer. As a supplement to the main algorithm, an image objects analysis and an image background analysis are performed and a supplemental aliasing algorithm is applied.

The system first analyzes the history of the video file in a sequence from the first frame up to the point of the last available frame. The system probabilistically identifies, represents and evaluates the colors, the objects and the temporal motion in the scenes. The initial analytical step includes identifying specific discrete scenes in the video. To do so, the system employs an algorithm that predicts a scene sequence. The algorithm uses a method to anticipate each scene in order to accelerate the analytical function. The prediction and anticipation processes are performed with local search metaheuristics. Most scenes have a starting and ending point, which delineates the scene sequence. Each video file is expected to have a set of continuous scenes.

A video file that is analyzed on the fly, that is, as the video is spooling, lacks the deterministic information of a completed video. Consequently, with limited information, the algorithm must be limited to a specified set of data with at least one scene. In these cases, compression methods are applied as the video is being taken in real-time. While this approach is efficient, the resulting compression data file is based on incomplete analysis of the whole video.

Once the video file is analyzed, the present hybrid video algorithm compares elements and objects between adjacent frames in a scene. The algorithm seeks to organize scene continuity by using scatter search metaheuristics. The scatter search algorithm identifies differences between consecutive frames and learns from each prior frame data set that makes evaluation of each successive frame more efficient.

The system applies local search (e.g., scatter search) algorithms to the video file to optimize the compression of the video file. Information from the algorithm is used to guide the compression of pixels in each frame that are designated to be redundant.

Once the system analyzes the video frames and performs a compression, the specific information on the compression algorithm is stored as meta-data in the video. This meta-data for each video file includes a key that describes the specific protocols and values used by the algorithm for each video.

This key is maintained with each video file so as to provide decompression solutions on demand.

In an embodiment of the invention, a video camera uses three sensors. In this case, each sensor creates a file that is individually compressed. When a single file is created from the convergence of the three sensor files, a single file is compressed. When multiple sensor files are compressed separately, they are individually decompressed and then combined into a single file.

(6) Method for Digital Video Compression Object Analysis

Objects are tracked in a frame sequence. The object-based tracking of video emphasizes the object sequence. As the object coverage in a scene increases, then an object tracking algorithm recognizes the incremental changes in the configuration and anticipates the object movement within a range of probabilities. As the object coverage in the scene decreases, for example as the scene ends, the algorithm recognizes the incremental changes and anticipates the future direction of objects in the scene. This object-based continuity allows the algorithm to evaluate a compression protocol.

By analyzing the contiguous pattern of objects in a video, the system assesses the patterns from frame to frame. From this data set, the algorithm is able to efficiently reduce the repetition of both specific objects and the background. When there is repetition in the video data file with frames featuring objects and a background, the system implements an aliasing bias to specific elements. Specific pixels in the frames with repetitious objects or a common background are reduced or removed in these portions of the image file set.

When a background is blurred as an effect of DOF reduction for a foreground object, then the background contains pixel elements that may be removed. Like object continuity data between frames, background data is analyzed between frames. The out of focus background is selectively aliased to increase efficiency and reduce redundancy.

Tracking a main object, a set of objects and a background allows the hybrid video compression algorithm to identify, track and modify continuous sequences of data sets. Unlike tradition video compression models, the present system uses object-based pattern analysis to implement a hybrid video compression approach.

(7) Method for Variable Direction Tabu Search Algorithm Applied to Digital Video File Compression Because relative image space fluctuates from frame to frame, it is necessary to analyze specific objects that ramp up and ramp down in each scene sequence. The optimal way to track the variable direction of objects in video sequences is to use machine learning tools. The learning algorithms use information that is available on a set of frames up to a specific point to input into memory useful experience. This access to memory of past frames then allows the algorithm to learn and to predict object sequences in video scenes.

One useful learning algorithm is the tabu search metaheuristic. The tabu search algorithm is used to eliminate spatial elements that have already been searched in prior frames. This elimination of prior spatial elements is useful to efficiently learn what not to search for in present and future frames. Since the objects are continuous between frames of a scene, there are some predictable aspects, such as object trajectory consistency and vector changes. In effect, the tabu search algorithm learns from experience during each scene and then builds a library of patterns to compare other scenes. This learning algorithm is useful to increase efficiency of the video evaluation and compression processes.

(8) Method for Accelerating Digital Video Compression Process

Because video files are large and performing compression on these large files is time-consuming, it is advantageous to develop ways to accelerate the video compression process. The present system uses algorithms to simultaneously compress different scenes in a video. The initial video analysis by the hybrid video compression algorithm identifies specific discrete scenes in the video file and applies compression algorithms to each scene simultaneously. In effect, a set of scenes is viewed as a batch, with each scene processed at the same time.

In one embodiment of the present invention, the video compression process is performed sequentially, from the first frame onwards, in real time. The real-time compression of early scenes, as the video is streaming, allows two functions of video capture and compression to occur nearly simultaneously. This process is performed by using an ASIC, DSP or SoC to compress the video feed after the digital sensor(s) capture(s) the video.

In another embodiment, after the video is captured and the video file is compressed, the data file is transmitted to a remote computer for filtration. While there is less data to filter, later filtration is able to compensate for data lost during compression.

In still another embodiment, a digital video file is captured and compressed and then sent to a remote computer for lossless decompression. The replica of the original decompressed file is then filtered to optimize the image.

(9) Method for Digital Video File Decompression

Lossless video compression using the present invention uses meta-data in each video file that contains a key describing the specific compression protocols used in each file. Digital video file decompression involves reversing the DVI compression process by employing the key. While the initial compression consists of a specific order of compressed layers for each pass of the compression process, the decompression process also uses a set of layers for each phase to decompress the video file.

The present system, however, allows the order of the priority of video decompression to change. The present system video decompression algorithm is variable and adjustable. Just as the DVI compression algorithm is scalable to allow an adjustable compression, the decompression is also scalable and adjustable. Consequently, the present invention uses an algorithm that will use the first frame as a first priority for video decompression, which is useful in streaming video files, but also a simultaneous scene decompression approach to accelerate the process of decompressing completed videos. By batch processing multiple scenes simultaneously, the present invention facilitates accelerated reconstruction techniques.

While lossless compression and decompression models of digital video compression algorithms retain bit for bit the original scene, lossy models are used to achieve a high degree of compression. The trade-off of high compression from lossy compression is irrevocably lost data sets. In order to reconstitute some lost data sets, the present invention uses predictive probabilities to assess the lost data. In one implementation, fuzzy logic is used to approximate the lost data and to restore the data.

One advantage of compressing digital video files is to optimize the use of limited bandwidth with large data files. The ability to compress a digital video file, transmit the file in constrained bandwidth and to decompress the video file is a form of bandwidth constraint utilization optimization. This approach allows real-time compression and transmission.

(10) Method for Decompression and Filtration of Digital Video File

One of the advantages of digital video file compression is the ability to transmit the file data in limited bandwidth and then to decompress the file. In some cases, filtering the video image file in the camera is useful in order to optimize the image. However, the subsequent compression of the video file then compromises the quality of the file. In the present system, then, the video file is only partially filtered before compression. The compression of the partially filtered file provides sufficient information to compress a high quality file rather than to compress a low quality unfiltered file. When performed with a lossless compression algorithm, the unfiltered compressed video file still needs filtration after the file is decompressed.

When the video file is partially filtered before it is compressed, the image sets are optimized for color and to correct for optical and digital aberrations. Without filtering the video file for color correction, the compressed file is distorted and is difficult to correct or restore.

Once the partially filtered video image file is compressed, it may be stored and transmitted. Once stored or transmitted, the compressed file is then decompressed (preferably losslessly) and filtered. The subsequent filtration techniques access a database of filtration algorithms in order to optimize the image.

Without partially filtering the original video file before compression, the video file would not be able to access or subsequently restore correct content.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

DESCRIPTION OF THE DRAWINGS

FIG. 10 is a flow chart showing the process of applying a fuzzy logic algorithm to compress an image file.

FIG. 11 is a flow chart showing the process of using an algorithm to organize meta-data in an image file for compression and decompression of image data.

FIG. 12 is a schematic drawing showing the process of aliasing of details in the background of an image file.

FIG. 17 is a flow chart showing the process of using camera circuitry to process image compression algorithms.

FIG. 18 is a flow chart showing the process of using the camera SoC and DSP to compress an image file.

FIG. 19 is a flow chart showing the process of using a camera SoC to decompress a compressed image file.

FIG. 24 is a flow chart showing the process of applying an algorithm to map a video file.

FIG. 25 is a schematic drawing showing a scatter search algorithm applied to three sequences of video frames.

FIG. 30 is a flow chart showing the process of applying object analysis to a video file for compression.

FIG. 31 is a flow chart showing the process of employing the tabu search algorithm to compress video frames in a video file.

DETAILED DESCRIPTION OF THE DRAWINGS

Digital image compression is an essential feature for processing and transmission of image files in modern cameras, computers and networks. The present invention provides lossless image file compression and decompression of still digital image files and video image files. The present image compression algorithms are modular since the component parts are applicable separately or together. The compression algorithms are applied to an image file in a camera by digital circuitry or in a computer. The still digital imaging (SDI) compression algorithm is illustrated in the present invention in several component parts.

Figure 1:
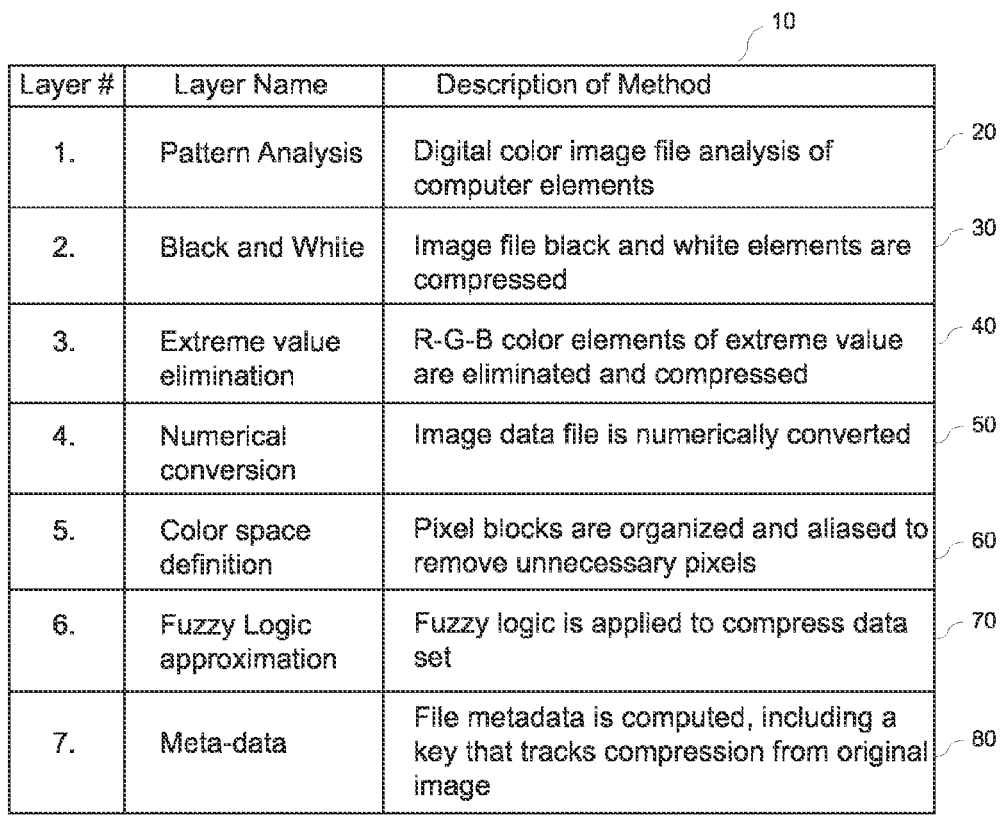
FIG. 1 is a table of system layers.

FIG. 1 is a table showing the system layers. There are seven layers of the compression algorithm. In the first layer, involving pattern analysis (20), which describes the digital color image file analysis of component elements. In the second layer, involving black and white color compression (30), the image file black and white elements are compressed. In the third layer, involving extreme value elimination (40), the R-G-B color elements of extreme value are eliminated and compressed. In the fourth layer, involving numerical conversion (50), the image data file is numerically converted. In the fifth layer, involving color space definition (60), pixel blocks are organized and aliased to remove unnecessary pixels. In the sixth layer, involving fuzzy logic approximation (70), fuzzy logic is applied to compress the data set. In the seventh layer, involving meta-data, the file metadata is computed (80), including a key that tracks compression from the original image.

Figure 2:
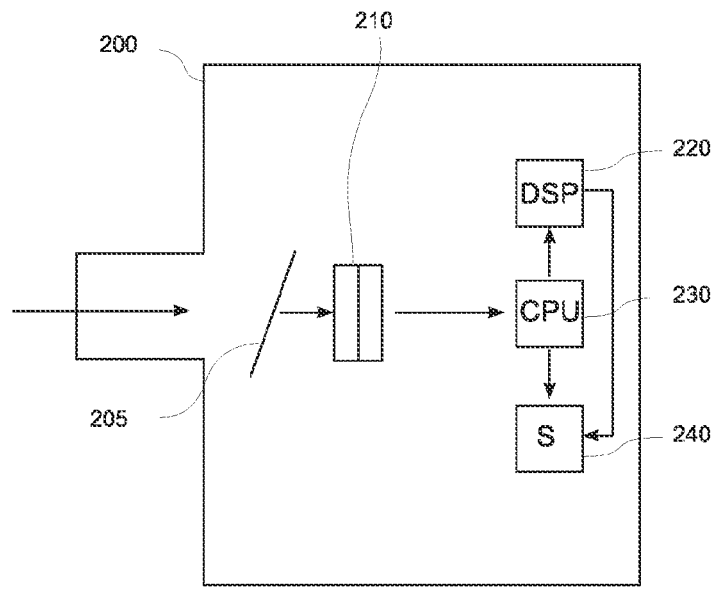
FIG. 2 is a schematic drawing showing a sensor forwarding an image file to a camera CPU, which applies a compression algorithm.

FIG. 2 shows a sensor forwarding an image file to a camera CPU, which applies a compression algorithm. The camera (200) is shown with a mirror (205), sensor (210), DSP (220), CPU (230) and storage (240) components. The sensor captures the image and transfers the image file to the CPU. The CPU sends the image file to the DSP to compress the image file and then sends the compressed image file to storage. In one implementation, the CPU is interchangeable with a SoC. In one embodiment, the image file is sent from the sensor directly to the DSP. In this implementation, the DSP accesses the CPU in order to obtain specific algorithms to apply to the image file, processes the image file and sends the processed image file to storage.

Figure 3:
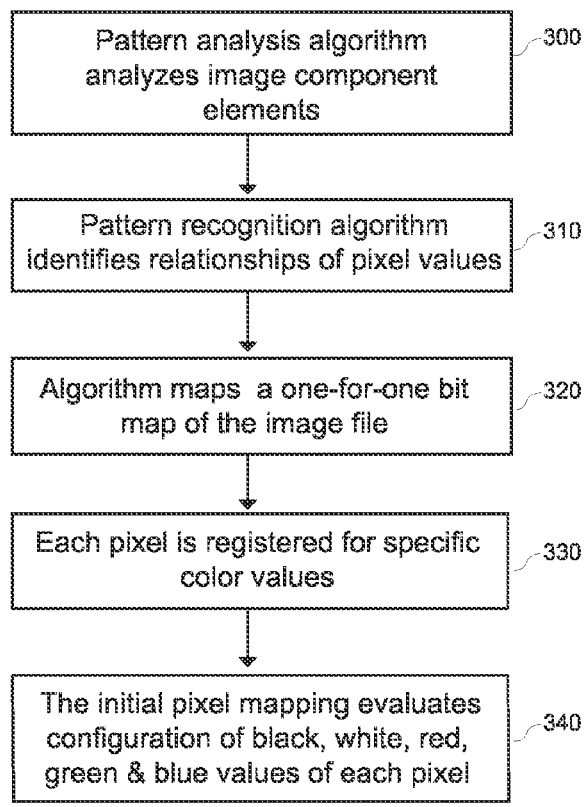
FIG. 3 is a flow chart showing the process of applying of an algorithm to an image file.

FIG. 3 shows the process of applying an algorithm to an image file. The pattern analysis algorithm analyzes the image component elements (300) and identifies the relationships of pixel values (310). The algorithm then maps a one-for-one bit map of the image file (320) and each pixel is registered for specific color values (330). The initial pixel mapping evaluates the configuration of black, white, red, green and blue values of each pixel (340).

Figure 4:
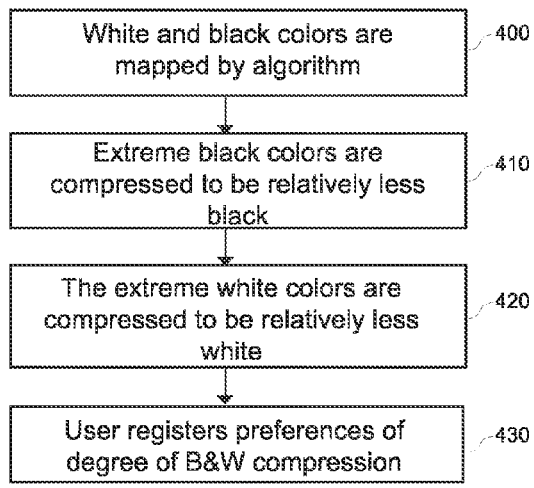
FIG. 4 is a flow chart showing the process of using a compression algorithm to compress black and white elements of an image file.

FIG. 4 shows the process of using a compression algorithm to compress black and white elements of an image file. After the white and black colors are mapped by the algorithm (400), the extreme black colors are compressed to be relatively less black (410). The extreme white colors are compressed to be relatively less white (420). The user registers preferences of the degree of black and white color compression (430).

Figure 5:
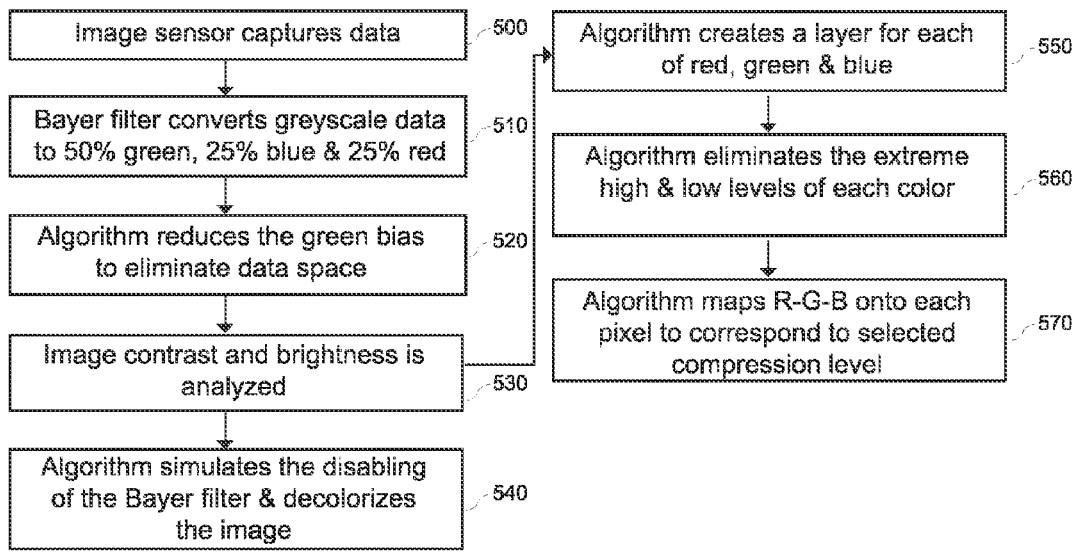
FIG. 5 is a flow chart showing the process of using an algorithm to compress R-G-B elements in an image file.

FIG. 5 shows the process of using an algorithm to compress R-G-B elements in an image file. After the image sensor captures data (500), the Bayer filter converts grey scale data to 50% green, 25% blue and 25% red (510). The algorithm reduces the green bias to eliminate data space (520). The image contrast and brightness is analyzed and adjusted (530). The image file is then either decolorized and compressed or the colors are compressed. The algorithm simulates the disabling of the Bayer filter and decolorizes the image (540). Alternatively, the algorithm creates a layer for each of red, green and blue (550), eliminates the extreme high and low levels of each color (560) and maps R-G-B onto each pixel to correspond to the selected compression level (570).

Figures 6, 7:
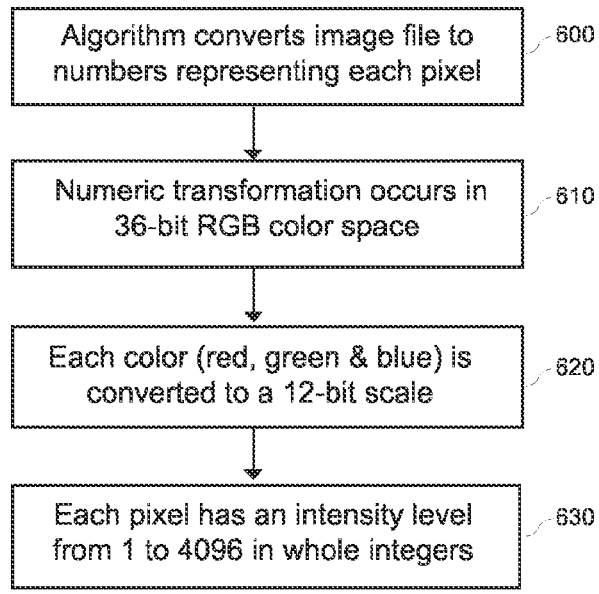
FIG. 6 is a flow chart showing the process of converting pixels in an image file to numerical values.
FIG. 7 is a table showing the block configurations of pixel combinations from superfine to super course.

FIG. 6 shows the process of converting pixels in an image file to numerical values. The algorithm converts an image file to numbers representing each pixel (600). The numeric transformation occurs in 36-bit R-G-B color space (610). Each color (R-G-B) is converted to a 12-bit scale (620) and each pixel has an intensity level from 1 to 4096 in whole integers (630).

Figure 8:
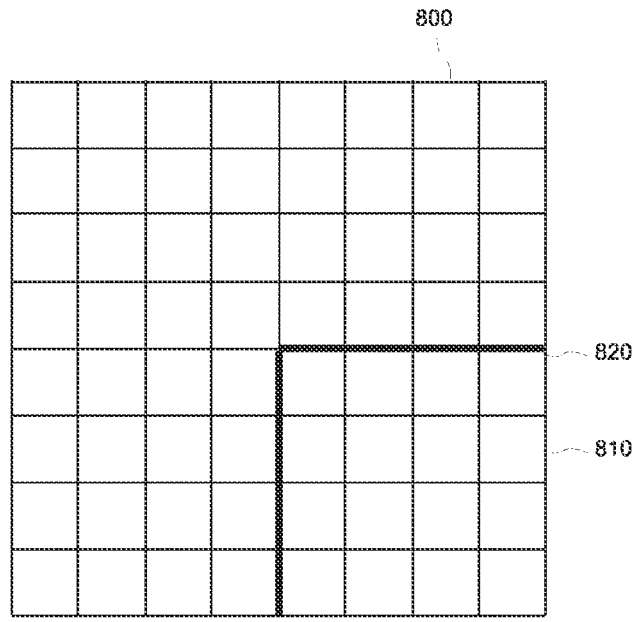
FIG. 8 is a schematic drawing showing a 4×4 block and an 8×8 block of pixels in an image file.

FIG. 7 shows the block configurations of pixel combinations from superfine to super course. The superfine grain pixel combination consists of a 4×4 block of pixels (700). The fine grain pixel combination consists of an 8×8 block of pixels (710). The medium grain pixel combination consists of a 16×16 block of pixels (720). The course grain pixel combination consists of a 32×32 block of pixels (730). The super-course grain pixel combination consists of a 64×64 block of pixels (740). These block configurations are used to sample and to compress the image file. FIG. 8 shows the example of a 4×4 block (810), demarcated by the border of the selected pixel configuration (820) and an 8×8 block (800) configuration.

Figure 9:
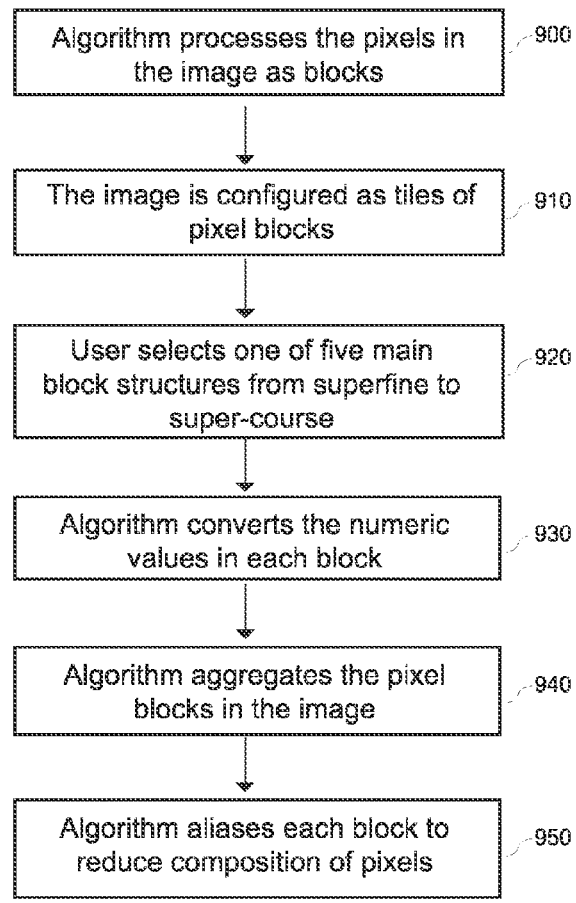
FIG. 9 is a flow chart showing the process of applying an algorithm to aggregate and alias pixel blocks in an image file.

FIG. 9 shows the process of applying an algorithm to aggregate and alias pixel blocks in an image file. After the algorithm processes the pixels in the image as blocks (900), the image is configured as tiles of pixel blocks (910). The user selects one of five main block structures from superfine to super-course (920). The algorithm converts the numeric values in each block (930) and aggregates the pixel blocks in the image (940). The algorithm then aliases each block to reduce the composition of pixels (950).

FIG. 10 shows the process of applying a fuzzy logic algorithm to compress an image file. After the algorithm applies fuzzy logic to round off the probability of actual color in the original image (1000), the fuzzy logic algorithm approximates the values by one half of one percent (1010). The fuzzy logic approach is then used repeatedly to reduce the values by one half of one percent and is user adjustable (1020). The fuzzy logic compression process constructs a key to specify the precise fuzzy logic application selected by the user (1030).

FIG. 11 shows the process of using an algorithm to organize meta-data in an image file for compression and decompression of image data. Once the algorithm creates a set of meta-data about data categories of the image (1100), the meta-data map synopsizes the image data (1110). The meta-data describes original image file parameters (1120) and describes precise steps used in compression (1130). The meta-data includes a key specifying compression and decompression details (1140).

FIG. 12 shows the process of aliasing of details in the background of an image file. The camera (1200) is shown capturing an image file and storing the image file in memory (1210). The image consists of three main objects (1220, 1230 and 1240). The image file (1250) consists of the three main objects (1260, 1265 and 1270). However, the background (1255) of the image is shown out of focus and thus the image background is aliased by the compression algorithm to remove the color and detail information from those parts of the image.

Figure 13:
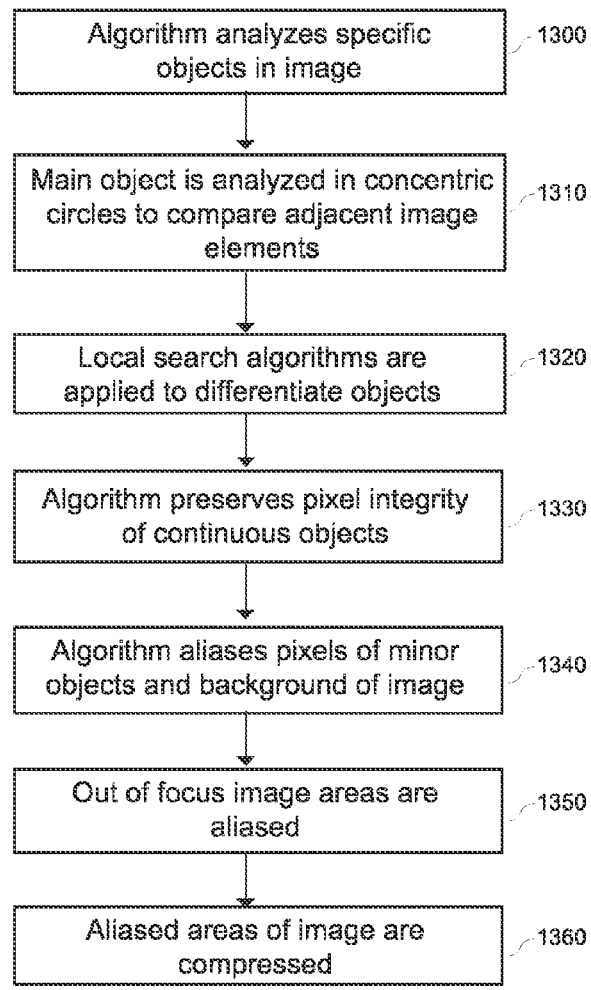
FIG. 13 is a flow chart showing the process of using an algorithm to analyze and alias image elements of an image file.

FIG. 13 shows the process of using an algorithm to analyze and alias image elements of an image file. After the algorithm analyzes specific objects in an image (1300), the main object is analyzed in concentric circles to compare adjacent image elements (1310). Local search algorithms are applied to differentiate objects (1320). These algorithms include scatter search and tabu search algorithms. The algorithm preserves pixel integrity of contiguous objects (1330) and aliases pixels of minor objects and the background of the image (1340). The out of focus image areas are aliased (1350) and the aliased areas of the image are compressed (1360).

Figure 14:
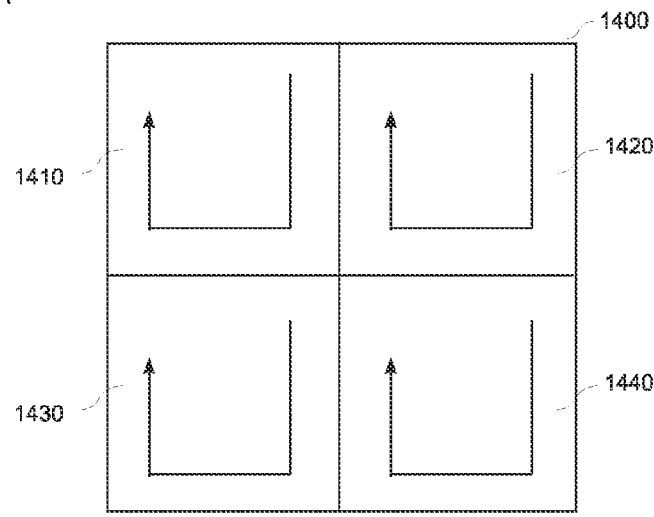
FIG. 14 is a schematic drawing showing the use of four quadrants to process an image file compression.

FIG. 14 shows the use of four quadrants to process an image file compression. The four quadrants of the image file (1400) are the upper left (1410), the upper right (1420), the lower left (1430) and the lower right (1440). The parallel processing of the four quadrants separately accelerates the image processing process. In one embodiment, the image is simultaneously processed in more than four component parts.

Figure 15:
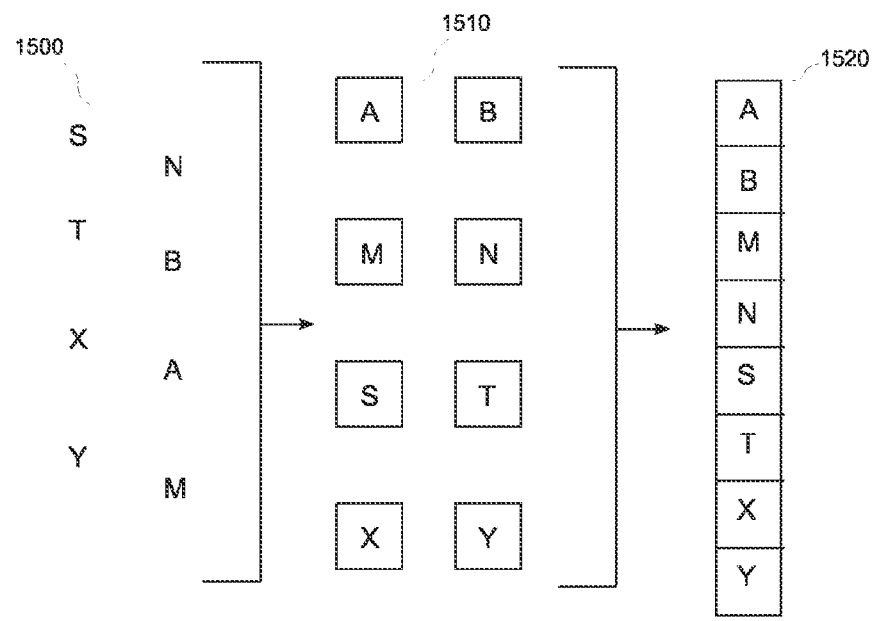
FIG. 15 is a schematic drawing showing the batch sorting of similar images in a set of image files.

FIG. 15 shows the batch sorting of similar images in a set of image files. The set of eight image files (1500) are shown as S, N, T, B, X, A, Y and M. The algorithm identifies the image file categories and sorts the categories (1510) into the pairs A and B, M and N, S and T and X and Y in the second phase. In the third phase (1520), the eight image file categories are arranged in a sequential order of A, B, M, N, S, T, X and Y.

Figure 16:
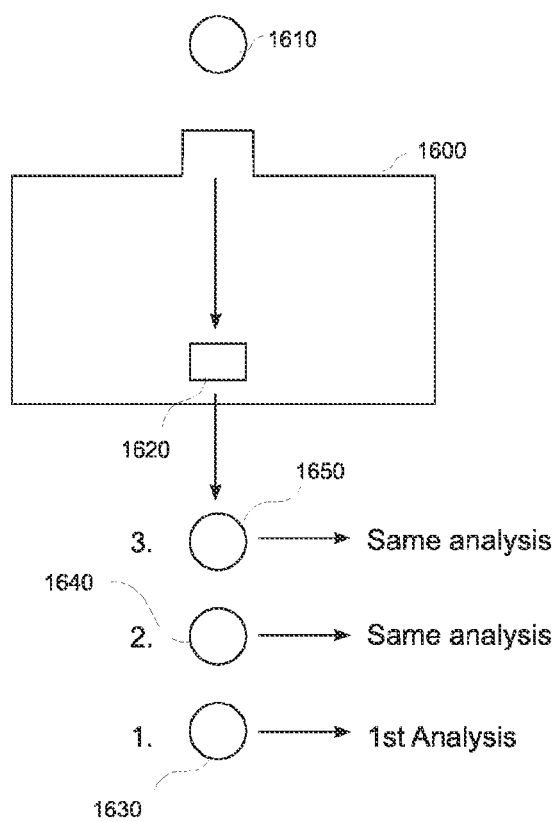
FIG. 16 is a schematic drawing showing the batch processing of a first image in a set of images and a similar processing of subsequent images.

FIG. 16 shows the batch processing of a first image in a set of images and a similar processing of subsequent images. The camera (1600) captures and places the image file in storage (1620) of an object (1610). The first image captured (1630) of the object is analyzed. The second (1640) and third (1650) images captured of the same object use the same image analysis as the first object analysis.

FIGS. 17 to 19 show the process of using camera circuitry to apply compression algorithms in the camera. Though the compression algorithms are applied in camera by using the SoC and DSP, the compression process may be applied with any digital circuitry that contains a DSP and controlling circuit such as an MP, SOC, CPU. In this case, the DSP may be an ASIC, an FPGA or an SoC.

FIG. 17 shows the process of using camera circuitry to process image compression algorithms. Once the sensor captures the image and sends the image file to the DSP (1700), the DSP filters the image file and sends the filtered file to the SoC (1710). The SoC applies the compression algorithms (1720) and the compressed image file is sent to storage (1730).

FIG. 18 shows the process of using the camera SoC and DSP to compress an image file. After the sensor captures an image and sends the image file to the SoC (1800), the SoC compresses the original image file (1810). The compressed image file is sent to the DSP (1820) and the DSP filters the compressed image file and sends the file to storage (1830).

FIG. 19 shows the process of using a camera SoC to decompress a compressed image file. Once the compressed image file is forwarded to the SoC (1900), the SoC accesses an image file key from the image file metadata (1910). The SoC identifies compression steps and values from the key (1920). The SoC applies the decompression algorithm in reverse order (1930) and the image file is decompressed according to user preferences (1940). The decompressed image file is then forwarded to storage (1950).

Figure 20:
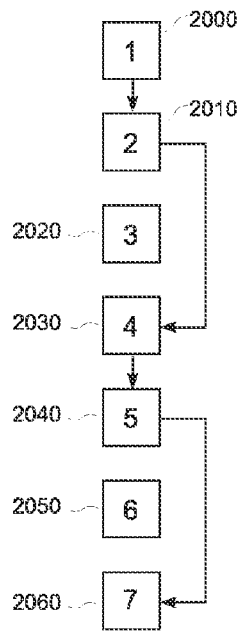
FIG. 20 is a schematic drawing showing how two steps in the seven step compression process are skipped.

FIG. 20 shows how two steps in the seven step compression process are skipped. The compression process shows the seven steps (2000, 2010, 2020, 2030, 2040, 2050 and 2060) 1 through 7. However, in the example in the drawing, steps three and six are omitted. The algorithm is modular and only steps one, two, four, five and seven are used.

Figure 21:
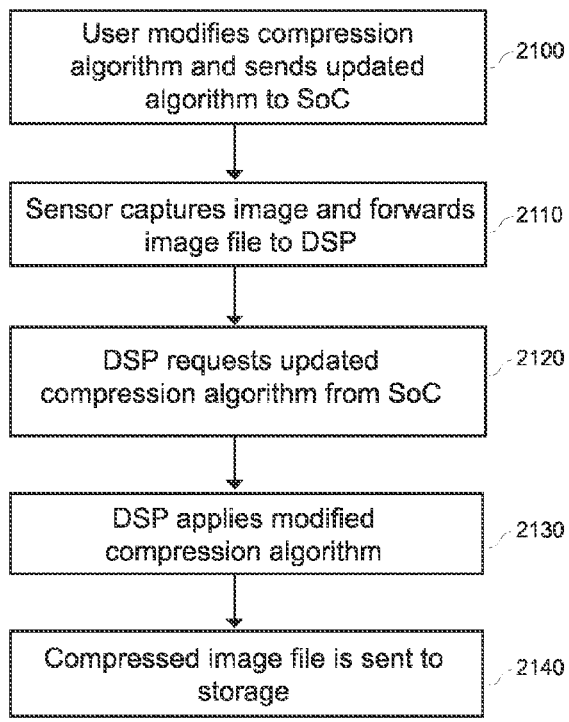
FIG. 21 is a flow chart showing the process of applying a modified compression algorithm by a camera DSP.

FIG. 21 shows the process of applying a modified compression algorithm by a camera DSP. After the user modifies the compression algorithm and sends the updated algorithm to the SoC (2100), the sensor captures an image and forwards the image file to the DSP (2110). The DSP requests an updated compression algorithm from the SoC (2120) and applies the modified compression algorithm (2130). The compressed image file is then sent to storage (2140).

Figure 22:
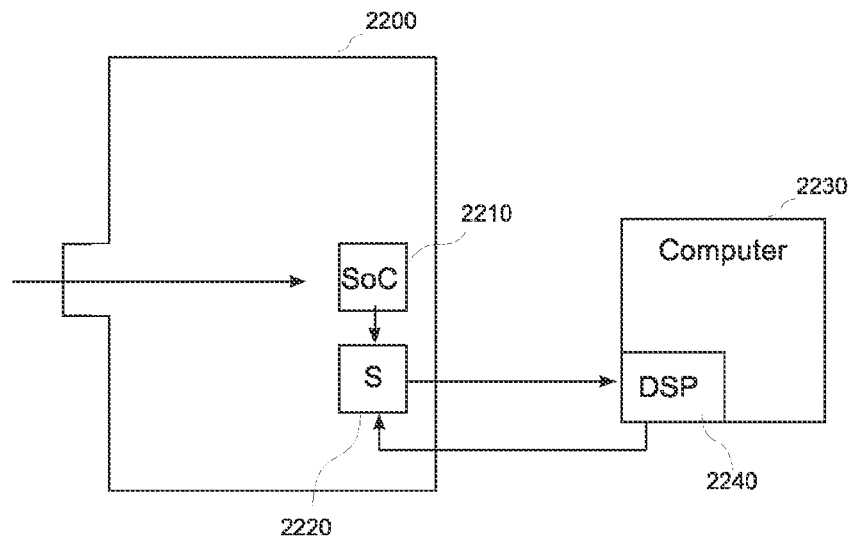
FIG. 22 is a schematic drawing showing the process of compressing an image file in a camera, decompressing and filtering the image file in an external computer and storing the image file in the camera.

FIG. 22 shows the process of compressing an image file in a camera, decompressing and filtering the image file in an external computer and storing the image file in the camera. The image file is sent to the SoC (2210) of the camera (2200) and then to storage (2220). The camera sends the image file from storage to an external computer (2230) DSP (2240), which compresses the image file and returns the compressed image file to the camera storage.

Figure 23:
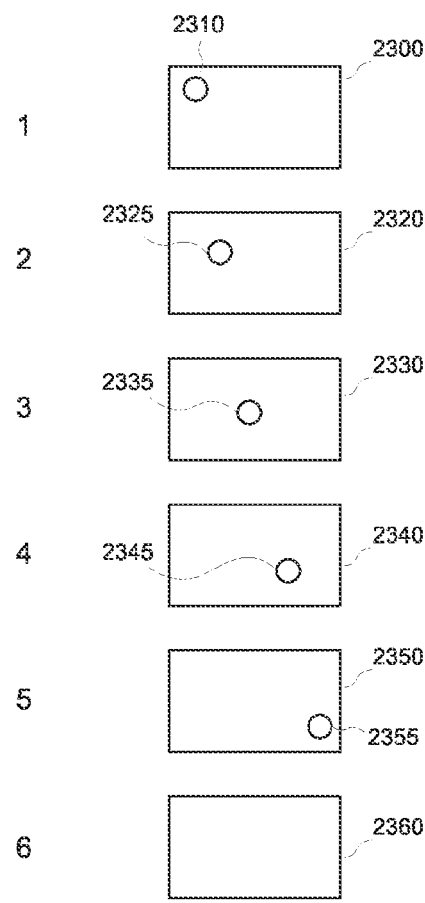
FIG. 23 is a schematic drawing showing the process of an object moving through a clear background in six frames of video imaging.

FIG. 23 shows the process of an object moving through a clear background in six frames of video imaging. This process is shown in six phases. In the first phase, the frame (2300) shows the object (2310) in the position in the upper left part of the frame. In the second phase, the frame (2320) shows the object (2325) in the left part of the frame. In the third phase, the frame (2330) shows the object (2335) in the middle of the frame. In the fourth phase, the frame (2340) shows the object (2345) in the right part of the frame. In the fifth phase, the frame (2350) shows the object (2355) in the lower right part of the frame. In the sixth phase, the frame is shown (2360) empty as the object has passed through and is no longer visible. The object is shown to move through the frames over time.

FIG. 24 shows the process of applying an algorithm to map a video file. After the system analyzes the history of the video file in a sequence from the first frame to the last frame (2400), the system identifies and evaluates colors in the scene (2410). These processes are performed by the system SoC, MP or CPU. The system identifies objects and probabilistically represents objects (2420). The system then identifies and represents the temporal motion of objects in the image sequence (2430) and identifies specific discrete scenes in the video (2440). The system employs at least one algorithm that predicts a scene sequence using a local search metaheuristic (2450) such as scatter search or tabu search. The prediction algorithm uses a method to anticipate object motion of each scene (2460) and the set of specific scenes in the video file are mapped (2470).

FIG. 25 shows a scatter search algorithm applied to three sequences of video frames. The scatter search algorithm (2580) is applied to the first sequence phase (2550, 2560 and 2570), then to the second sequence phase (2520, 2530 and 2540) and then to the third sequence phase (2500 and 2510).

Figure 26:
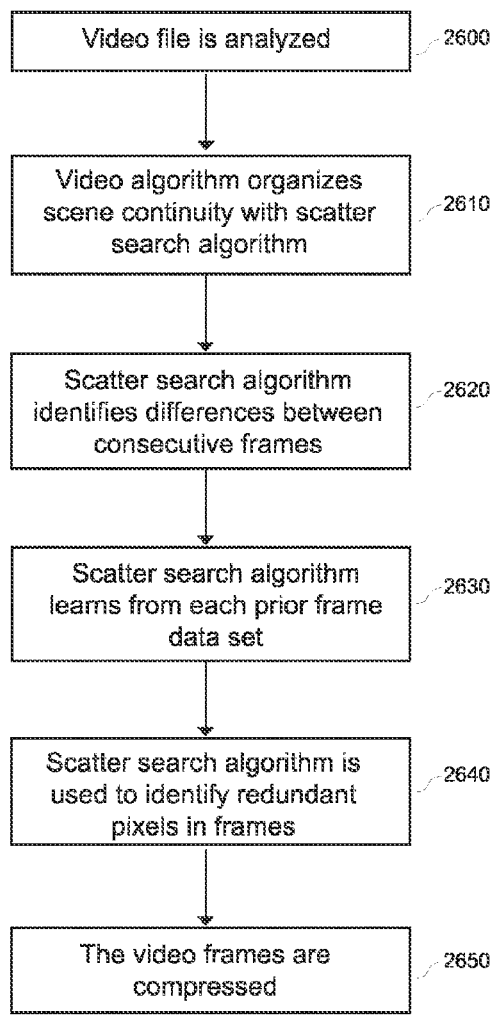
FIG. 26 is a flow chart showing the use of a scatter search algorithm to video frames for compression of a video image file.

FIG. 26 shows the application of a scatter search algorithm to video frames for compression of a video image file. Once the video file is analyzed (2600), the video algorithm organizes the scene continuity with the scatter search algorithm (2610). The scatter search algorithm identifies differences between consecutive frames (2620), learns from each prior frame data set (2630) and is used to identify redundant pixels in frames (2640). The video frames are then compressed (2650).

Figure 27:
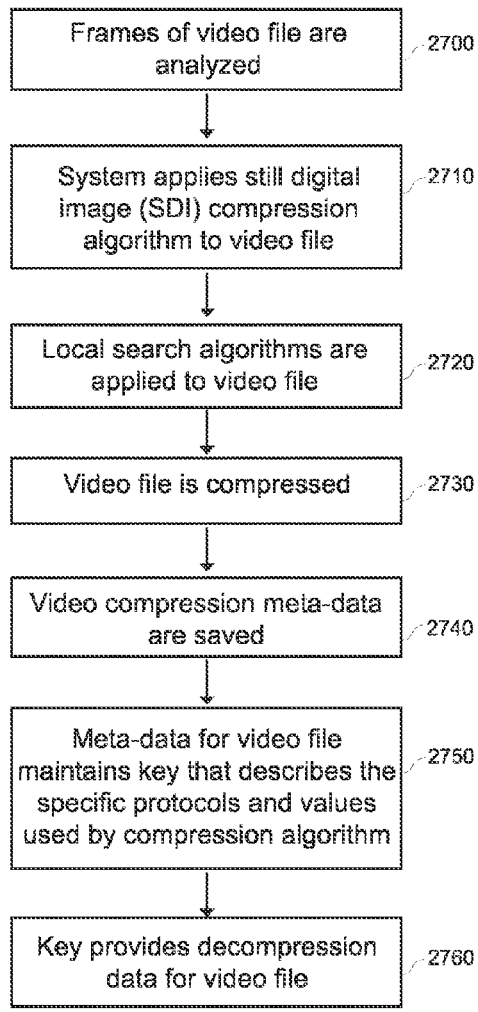
FIG. 27 is a flow chart showing the process of using algorithms to compress a video file.

FIG. 27 shows the process of using algorithms to compress a video file. After the frames of the video file are analyzed (2700), the system applies the still digital image (SDI) compression algorithm to the video file (2710). The local search algorithms are applied to the video file (2720) and the video file is compressed (2730). The video compression meta-data are saved (2740) and the meta-data for the video file maintain a key that describes the specific protocols and values used by the compression algorithm (2750). The key provides the decompression data for the video file (2760).

Figure 28:
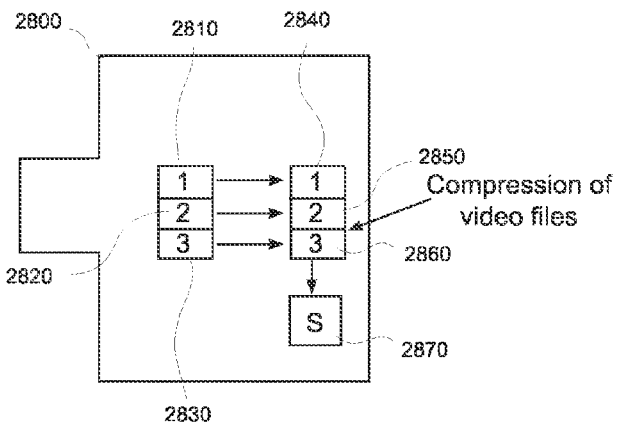
FIG. 28 is a schematic drawing of three (RGB) sensors feeding image files to three DSPs, combining and compressing the files in a video camera.

FIG. 28 shows three RGB sensors feeding image files to three DSPs in a video camera. The camera (2800) is shown with the three sensors, sensor 1 (2810), sensor 2 (2820) and sensor 3 (2830). Each sensor feeds an image file to a separate DSP. Sensor 1 sends an image file to DSP 1 (2840). Sensor 2 sends an image file to DSP 2 (2850) and sensor 3 sends an image file to DSP 3 (2860). The image files are aggregated and compressed by the DSPs and then sent to storage (2870). In one implementation, the files from DSPs 1 and 2 are sent to DSP 3 to combine the image files. In another implementation, once combined into one file, DSP 3 compresses the unified file before sending it to storage.

Figure 29:
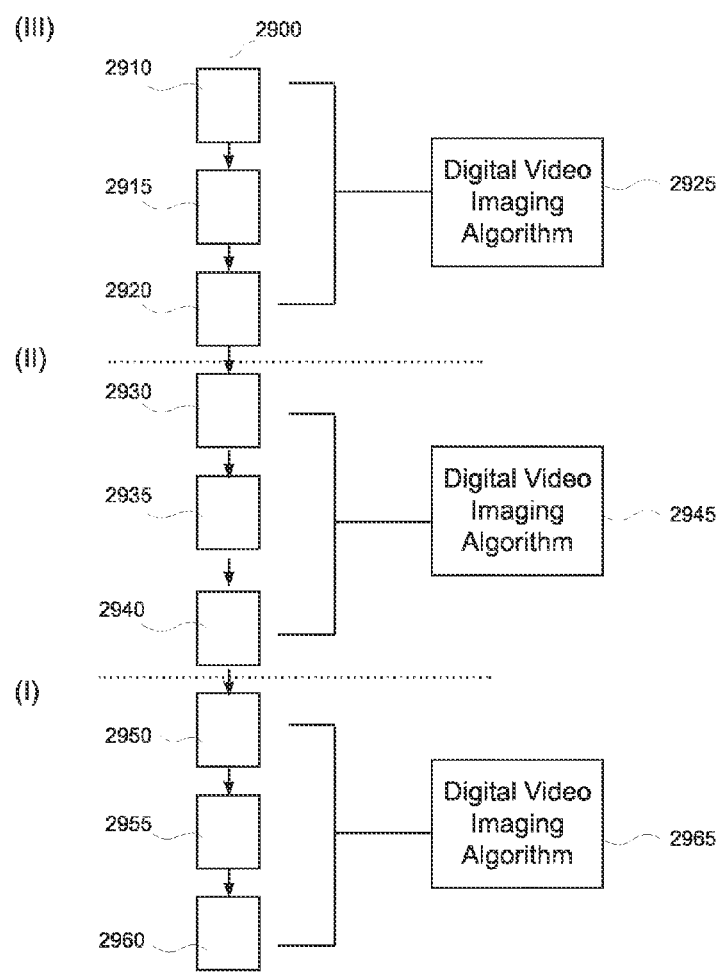
FIG. 29 is a schematic drawing showing the parallel use of the digital video image compression algorithm on sequences of a video file.

FIG. 29 shows the parallel use of the digital video image compression algorithm on sequences of a video file. The video file (2900) consists of a set of frames (2910-2960) organized as a set of three sequences. The first phase shows image frames (2950, 2955 and 2960) treated with a digital video imaging algorithm (2965). The second phase shows image frames (2930, 2935 and 2940) treated with a digital video imaging algorithm (2945). The third phase shows image frames (2910, 2915 and 2920) treated with a digital video imaging algorithm (2925). The advantage of treating the multiple phases of video file in parallel is to accelerate the processing. In one implementation, the DVI algorithms are identical. In another implementation, the DVI algorithms are different. For instance, when the image file content is different, different algorithms may treat the image files more efficiently or correspond to user preferences.

FIG. 30 shows the process of applying object analysis to a video file for compression. After the system tracks objects in video frames (3000), the system anticipate object movement scenarios within a range of probabilities (3010). The system analyzes and compares object patterns from frame to frame (3020) and reduces the repetition of both specific objects and the background (3030). The system applies an aliasing bias to specific low priority objects and to out of focus areas of the background (3040) and compresses specific pixels in video frames with repetitious objects or a common background (3050).

FIG. 31 shows the process of employing the tabu search algorithm to compress video frames in a video file. Once the system searches patterns of past frames to predict object sequences in video scenes (3100), continuous objects between video frames present object trajectory and vector changes (3110). The system applies the tabu search algorithm to eliminate spatial elements already searched in prior frames (3120). The tabu search algorithm then builds a library of patterns of scenes to compare future scenes (3130). The video frames are compressed as video elements are eliminated by the tabu search algorithm (3140). The efficiency of the video compression maximized (3450).

Figure 32:
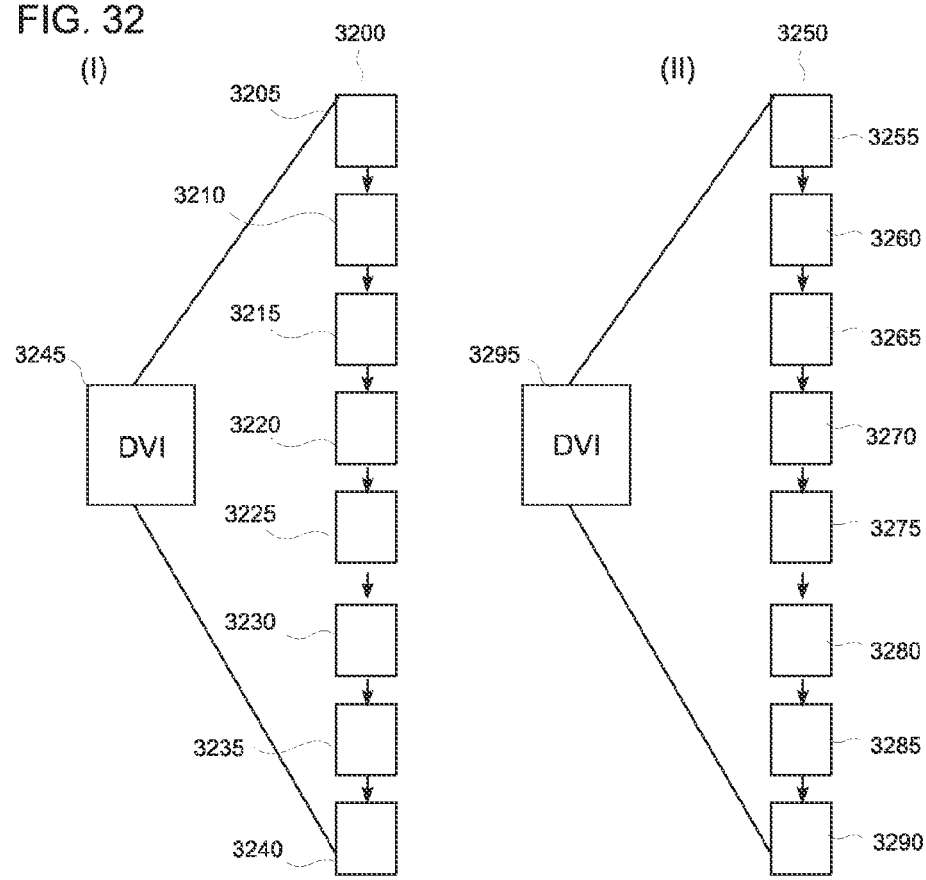
FIG. 32 is a schematic drawing showing the process of compressing two batches of video image files.

FIG. 32 shows the process of compressing two batches of video image files. The first phase shows the application of the DVI algorithm (3245) to the video file (3200) containing the sequence of images (3205-3240). The second phase shows the application of the DVI algorithm (3295) to the video file (3250) containing the sequence of images (3255-3290).

Figure 33:
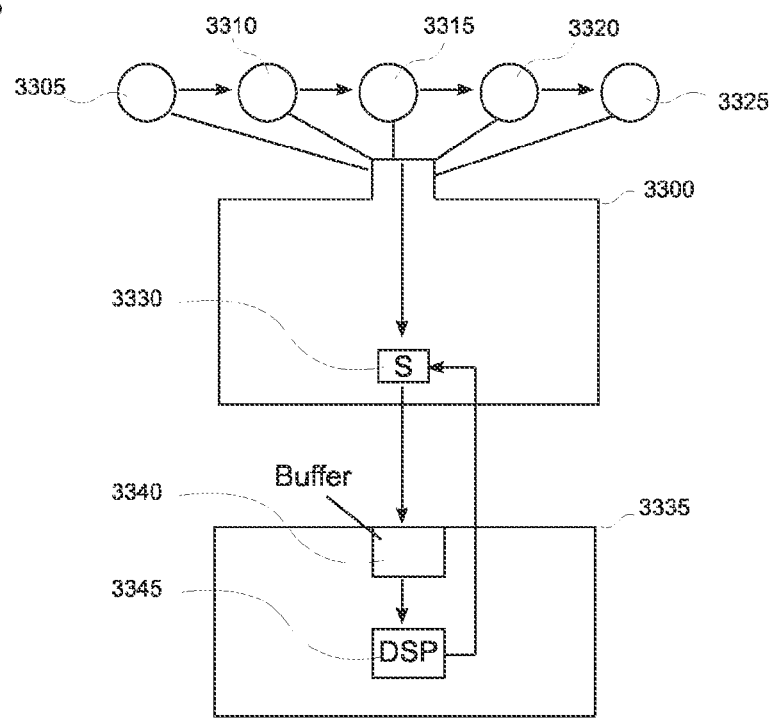
FIG. 33 is a schematic drawing showing the capture of a moving object with a video camera and the compression of the video file in an external computer.

FIG. 33 shows the capture of a moving object with a video camera and the compression of the video file in an external computer. The moving object (3305) is shown moving to positions 3310, 3315, 3320 and 3325. The moving object is captured by the camera (3300) and the video image file is put into camera storage (3330). The video image file is then sent to an external computer (3335), which receives the file in a buffer (3340) and sends the file to the DSP (3345) for application of the DVI algorithm to the video file. Once compressed, the video file is returned to the camera storage.

Figure 34:
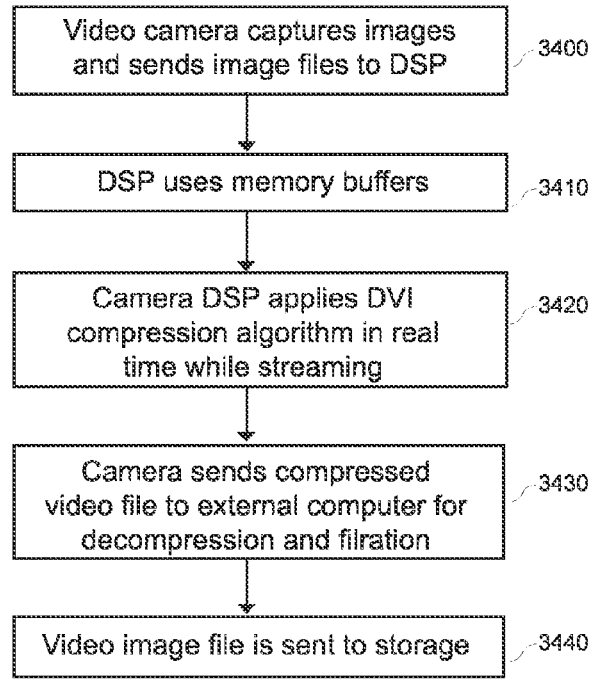
FIG. 34 is a flow chart showing the process of using a video camera DSP to compress a video file.

FIG. 34 shows the process of using a video camera DSP to compress a video file. Once the video camera captures images and sends the image files to the DSP (3400), the DSP uses memory buffers to queue the video file (3410). The camera DSP applies the DVI compression algorithm in real time while streaming (3420). The camera sends the compressed video file to an external computer for decompression and filtration (3430) and the video image file is sent to storage (3440). In one implementation, the camera filters the image file before or after the compression of the image file. Once filtered and compressed, the image file is sent to the external computer.

Figure 35:
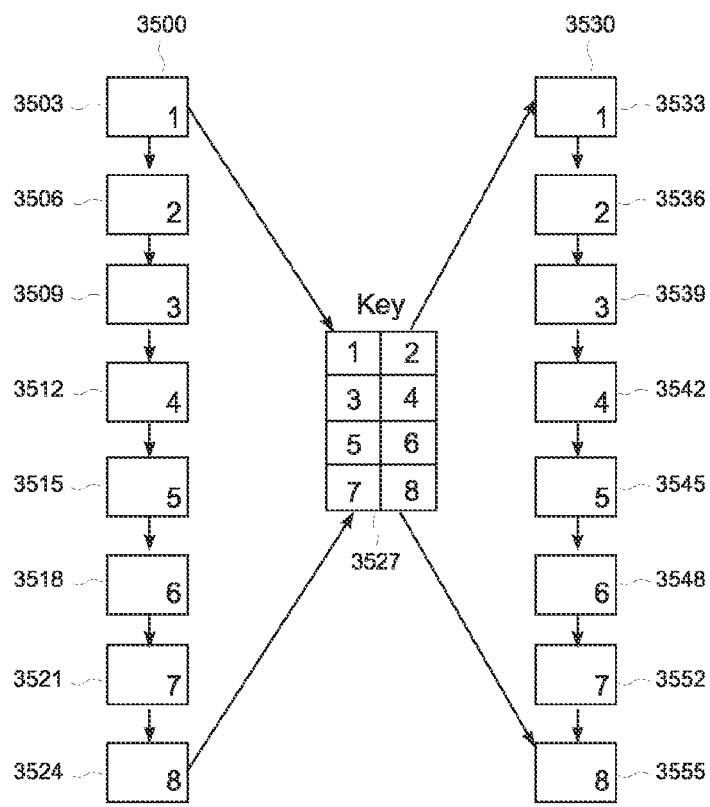
FIG. 35 is a schematic drawing showing the process of compressing a video file with a key that is used for the decompression of the video file.

FIG. 35 shows the process of compressing a video file with a key that is used for the decompression of the video file. In the left column, the video file (3500) is shown consisting of eight frames (3503-3524). Once compressed, the video file configures a key that delineates the sequence of DVI algorithm specificity used in the compression. The key is then applied to decompress the image file (3530) in the right column, consisting of the eight frames (3533-3555). The image file is fully decompressed once the key is applied and the system reverses the compression algorithm.

Figure 36:
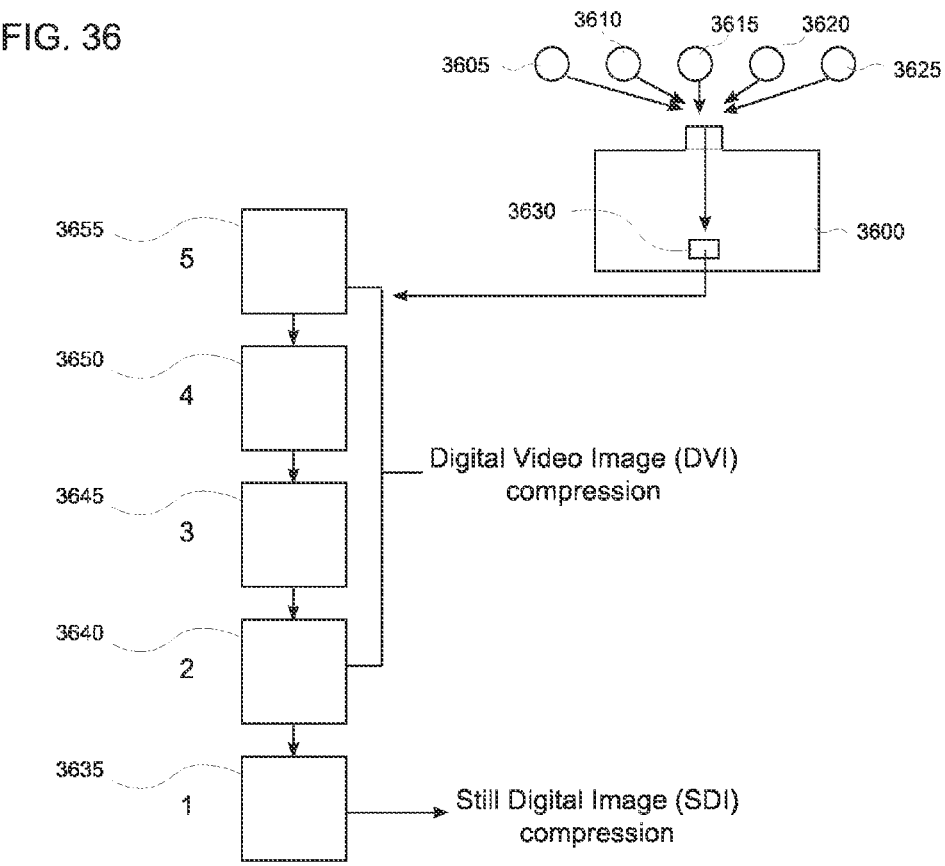
FIG. 36 is a schematic drawing showing the process of applying a still digital image compression algorithm on the first image of a video file and a digital video image compression algorithm to other frames in the video file.

FIG. 36 shows the process of applying a still digital image compression algorithm on the first image of a video file and a digital video image compression algorithm to other frames in the video file. The video camera (3600) captures objects (3605, 3610, 3615, 3620 and 3625) and transfers the image files to the DSP (3630). The DSP applies the SDI compression algorithm to the first frame (3635) in the sequence. Once the SDI compression algorithm is applied, the DSP applies the DVI compression algorithm to the additional image files in the video image sequence. This approach has the advantage of analyzing and compressing the first image while rapidly processing similar image frames in the video sequence.

Figure 37:
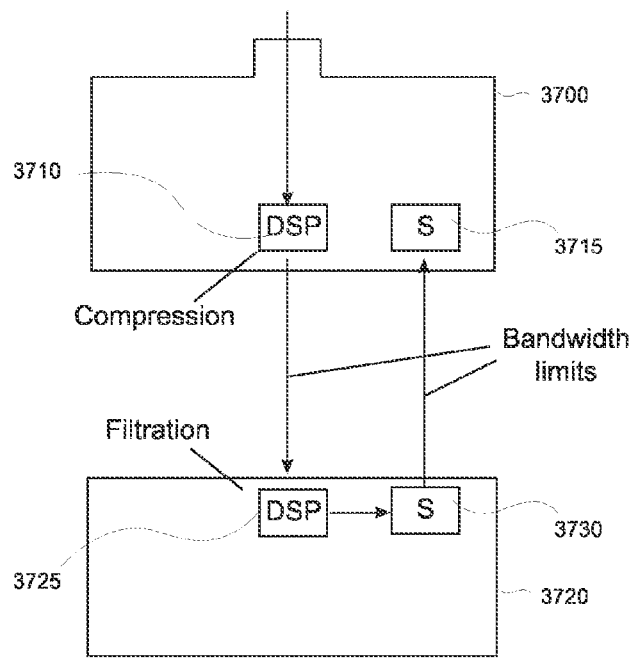
FIG. 37 is a schematic drawing showing the process of using camera circuitry to compress image files and the exportation of the files to an external computer for filtration.

FIG. 37 shows the process of using camera circuitry to compress image files and the exportation of the files to an external computer for filtration. The camera (3700) captures an image file and sends the file to the camera DSP (3710), which compresses the image file. The compressed image file is then sent to the external computer (3720) DSP (3725), which filters the compressed file and sends the file to storage (3730). The compressed filtered file is then sent back to the camera storage (3715). In one implementation, the image file is decompressed by the external computer in order to perform filtration on an uncompressed image file and then recompressed after filtration. The advantage of this approach is that a compressed file, particularly a video file, uses less bandwidth than an uncompressed file.

Figure 38:
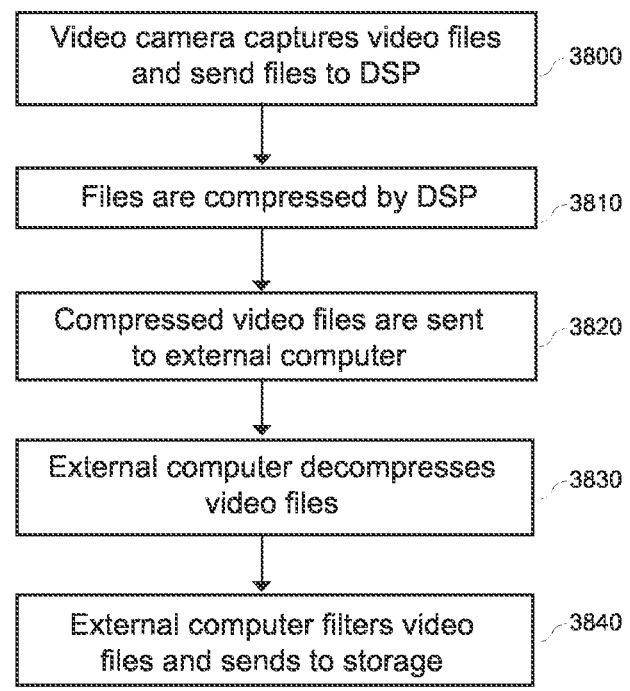
FIG. 38 is a flow chart showing the process of exporting a compressed video file to a computer for filtration and storage.

FIG. 38 shows the process of exporting a compressed video file to a computer for filtration and storage. After the video camera captures video files and sends the files to the DSP (3800), the files are compressed by the DSP (3810). The compressed video files are sent to an external computer (3820) and the external computer decompresses the video files (3830). The external computer filters video files and sends the files to storage (3840).

While the present system is used in cameras to compress image files, it may also be used on computers and in DSP and SoC circuits. The compression algorithms described herein may be embedded in specific chipsets for application to still image and video files.

The present system may also be applied to 3D images, including 3D still images and 3D digital video and cinematography images.

I claim:

1. A system for compressing a digital color image file comprising:
a processor executing the following steps: a first step of providing pattern analysis of image component elements; a second step of compressing black and white elements; a third step of providing extreme value elimination of R-G-B color elements; a fourth step of converting compressed image values to numerical values; a fifth step of providing color space definition wherein pixel blocks are organized and removing unnecessary pixels; a sixth step of applying fuzzy logic approximation to compress data set; a seventh step of generating meta-data including a key that tracks compression from original; wherein after the digital color file is transformed to a compressed state, the digital file is forwarded to a memory circuit for storage.

2. A method for digital color image compression comprising the steps of:
a first step, executed by a processor, of providing pattern analysis of image component elements; a second step of compressing black and white elements; a third step of providing extreme value elimination of R-G-B color elements; a fourth step of converting compressed image values to numerical values; a fifth step of providing color space definition wherein pixel blocks are organized and removing unnecessary pixels; a sixth step of applying fuzzy logic approximation to compress data set; a seventh step of generating meta-data including a key that tracks compression from original; and an eight step of forwarding the compressed digital color image file to a memory circuit.

3. An apparatus for digital color image decompression comprising: a digital camera, and a digital signal processor (DSP) performing the following steps: a first step, executed by a processor, of providing pattern analysis of image component elements; a second step of compressing black and white elements; a third step of providing extreme value elimination of R-G-B color elements; a fourth step of converting compressed image values to numerical values; a fifth step of providing color space definition wherein pixel blocks are organized and removing unnecessary pixels; a sixth step of applying fuzzy logic approximation to compress data set; a seventh step of generating meta-data including a key that tracks compression from original; and an eight step of forwarding the compressed digital color image file to a memory circuit.

4. The method of claim 2, further comprising the steps of: analyzing the image component elements using a pattern recognition algorithm; using the algorithm to identify relationships of pixel values; applying the algorithm to generate a one-for-one bit map of the image file; and registering for specific color values for each pixel.

5. The method of claim 2, further comprising the steps of: mapping extreme dark and extreme light colors; compressing extreme black colors to be less black; and compressing extreme white colors to be less white.

6. The method of claim 2, further comprising the steps of: reducing green bias to eliminate data file space;
analyzing brightness and contrast in the image;
eliminating extreme high and low levels or red, green & blue colors; and
mapping onto each pixel the modified value set.

7. The method of claim 2, further comprising the steps of: converting each pixel to numbers;
applying a 16-bit color scale to each R-G-B color; and
producing a large total color palate.

8. The method of claim 2, further comprising the steps of: processing the pixels in the image blocks; and
allowing a user to select one of five main block structures for fine or course grained image processing from superfine grain mode to very course grain mode.

9. The method of claim 2, further comprising the steps of: applying a fuzzy logic algorithm to approximate values of digital signals to round up or down the probability of the actual color;
eliminating components of the image file; and
repeatedly applying fuzzy logic algorithm to obtain a preferred image compression quantity.

10. The method of claim 2, further comprising the steps of: applying an algorithm to generate a meta-data map of the image file to synopsize the image data;
generating a key that represents the sequence of compression steps and quantities in the meta-data map; and
including in the meta-data map image data describing the original image file.

11. The method of claim 2, comprising the steps of:
Applying the key containing the meta-data map representing the sequence of compression steps in reverse; decompressing the digital color image file according to the specific compression steps; and storing the decompressed image file in memory.

12. The method of claim 2, further comprising the steps of: identifying objects in the image by applying a local search algorithm;
selecting a main object;
identifying a depth of field in the image;
aliasing inferior objects and out-of-focus areas;
reducing pixels relative to an in-focus objects; and
further eliminating pixel blocks in the inferior objects.

13. The method of claim 2, further comprising the steps of: demarcating quadrants in the image file;
applying the compression steps in each quadrant simultaneously; and
accelerating the image compression process.

* * * * *